US011818781B2

(12) United States Patent
Jin et al.

(10) Patent No.: US 11,818,781 B2
(45) Date of Patent: Nov. 14, 2023

(54) COMMUNICATION METHOD BETWEEN MULTI DEVICES IN BLUETOOTH COMMUNICATION ENVIRONMENT AND ELECTRONIC DEVICE THEREFOR

(71) Applicant: Samsung Electronics Co., Ltd., Suwon-si (KR)

(72) Inventors: Juyeon Jin, Suwon-si (KR); Gupil Cheong, Suwon-si (KR); Sanghyeok Sim, Suwon-si (KR); Doosuk Kang, Suwon-si (KR); Bokun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 17/335,577

(22) Filed: Jun. 1, 2021

(65) Prior Publication Data

US 2021/0385893 A1 Dec. 9, 2021

(30) Foreign Application Priority Data

Jun. 4, 2020 (KR) ........................ 10-2020-0067934

(51) Int. Cl.
*H04L 5/00* (2006.01)
*H04W 76/15* (2018.01)
(Continued)

(52) U.S. Cl.
CPC .............. *H04W 76/15* (2018.02); *H04R 1/40* (2013.01); *H04W 12/55* (2021.01);
(Continued)

(58) Field of Classification Search
None
See application file for complete search history.

(56) References Cited

U.S. PATENT DOCUMENTS

| 7,311,526 B2 | 12/2007 | Rohrbach et al. |
| 7,351,066 B2 | 4/2008 | Difonzo et al. |
| (Continued) | | |

FOREIGN PATENT DOCUMENTS

| KR | 10-2018-0128302 A | 12/2018 |
| KR | 10-2019-0084584 A | 7/2019 |
| KR | 10-2020-0044505 A | 4/2020 |

OTHER PUBLICATIONS

International Search Report dated Sep. 17, 2021, issued in International Patent Application No. PCT/KR2021/006790.

*Primary Examiner* — Sithu Ko
(74) *Attorney, Agent, or Firm* — Jefferson IP Law, LLP

(57) ABSTRACT

An electronic device is provided. The electronic device includes an audio reception circuit, an audio output circuit, a communication circuit configured to support Bluetooth communication, a processor, and a memory. The processor may be configured to connect to a first external electronic device by a first communication link, connect a second external electronic device with a second communication link, transmit connection information including information about the first communication link to the second external electronic device via the second communication link, receive first data from the second external electronic device via the first communication link on a first time slot for data transmission from the first external electronic device of the first communication link, and transmit second data to the second external electronic device via the first communication link on a second time slot for data transmission to the first external electronic device of the first communication link.

17 Claims, 18 Drawing Sheets

(51) Int. Cl.
*H04R 1/40* (2006.01)
*H04W 12/55* (2021.01)
*H04W 72/0446* (2023.01)
*H04W 76/14* (2018.01)

(52) U.S. Cl.
CPC ....... *H04W 72/0446* (2013.01); *H04W 76/14* (2018.02); *H04R 2420/07* (2013.01)

(56) References Cited

U.S. PATENT DOCUMENTS

| | | | |
|---|---|---|---|
| 7,517,222 B2 | 4/2009 | Rohrbach et al. | |
| 8,768,252 B2 * | 7/2014 | Watson | H04L 1/16 455/3.06 |
| 9,305,568 B2 | 4/2016 | Kraft et al. | |
| 9,524,731 B2 | 12/2016 | Kraft et al. | |
| 9,557,960 B2 | 1/2017 | Kraft et al. | |
| 9,713,018 B2 | 7/2017 | Das et al. | |
| 9,769,558 B2 | 9/2017 | Chandramohan et al. | |
| 9,820,323 B1 * | 11/2017 | Young | H04W 4/80 |
| 9,825,598 B2 | 11/2017 | Kraft et al. | |
| 9,961,431 B2 | 5/2018 | McPeak et al. | |
| 9,961,433 B2 | 5/2018 | Chawan et al. | |
| 9,967,644 B2 | 5/2018 | Chawan et al. | |
| 10,313,775 B2 | 6/2019 | Hankey et al. | |
| 10,348,370 B2 * | 7/2019 | Thoen | H04W 88/182 |
| 10,506,584 B2 | 12/2019 | Prajapati et al. | |
| 10,511,937 B2 | 12/2019 | Zhang et al. | |
| 10,834,738 B2 | 11/2020 | Paycher et al. | |
| 10,880,884 B2 | 12/2020 | Medapalli et al. | |
| 10,932,043 B2 * | 2/2021 | Tong | H04L 1/1854 |
| 11,057,911 B2 * | 7/2021 | Wang | H04W 76/15 |
| 11,083,031 B1 * | 8/2021 | Ferrari | H04W 24/08 |
| 11,153,701 B2 * | 10/2021 | Sridharan | H04R 5/033 |
| 2007/0223430 A1 * | 9/2007 | Desai | H04L 1/1854 370/338 |
| 2013/0155931 A1 | 6/2013 | Prajapati et al. | |
| 2013/0196643 A1 | 8/2013 | Medapalli et al. | |
| 2015/0305031 A1 | 10/2015 | Prajapati et al. | |
| 2015/0382106 A1 | 12/2015 | Kraft et al. | |
| 2016/0119797 A1 | 4/2016 | Das et al. | |
| 2017/0094399 A1 | 3/2017 | Chandramohan et al. | |
| 2018/0152806 A1 | 5/2018 | Zhang et al. | |
| 2018/0255389 A1 | 9/2018 | Hankey et al. | |
| 2018/0352558 A1 | 12/2018 | Paycher et al. | |
| 2020/0128620 A1 * | 4/2020 | Han | H04W 88/04 |
| 2020/0162205 A1 | 5/2020 | Han et al. | |
| 2020/0374820 A1 * | 11/2020 | Srivastava | H04L 5/0055 |
| 2021/0068194 A1 | 3/2021 | Han et al. | |

\* cited by examiner

COMMUNICATION METHOD BETWEEN MULTI DEVICES IN BLUETOOTH COMMUNICATION ENVIRONMENT AND ELECTRONIC DEVICE THEREFOR

CROSS-REFERENCE TO RELATED APPLICATION(S)

This application is based on and claims priority under 35 U.S.C. § 119(a) of a Korean patent application number 10-2020-0067934, filed on Jun. 4, 2020, in the Korean Intellectual Property Office, the disclosure of which is incorporated by reference herein in its entirety.

BACKGROUND

1. Field

The disclosure relates to a method of communication between multiple devices in a Bluetooth environment and an electronic device therefor.

2. Description of Related Art

A Bluetooth technology standard stipulated by the Bluetooth Special Interest Group (SIG) defines a protocol for short range wireless communication between electronic devices. In a Bluetooth network environment, electronic devices may transmit or receive data packets including content such as a text, voice, image, or video at a specified frequency band (e.g., about 2.4 gigahertz (GHz)).

For example, user equipment (UE) such as a smartphone, tablet, desktop computer, or laptop computer may transmit data packets to another user equipment or accessory device. The accessory device may include, for example, at least one of an earphone, a headset, a speaker, a mouse, a keyboard, or a display device.

A topology representing the Bluetooth network environment may include one user device (e.g., a device under test (DUT)) that transmits data packets and a plurality of devices that receive data packets from the user device. For example, when earphones (or a headset) are connected to a smartphone, one earphone worn on the left ear of a user and one earphone worn on the right ear of the user may receive data packets from the smartphone.

Each of a plurality of devices receiving data packets may form an individual link with the user device unless the plurality of devices are connected to each other by wire. In this case, since the user device has to generate a plurality of links in order to transmit data packets, resource consumption and power consumption of the user device may occur and complexity may increase. Furthermore, as the number of devices to which the user device has to transmit data packets increases, the power consumption of the user device and the time required for data packets to arrive at the devices may increase. Furthermore, although one earphone may receive data, the other earphone may fail to receive data. In this case, the power consumption of the user device may increase due to retransmission of data. Moreover, network throughput may decrease due to repetition of data retransmission.

For example, two people may talk to each other in a very noisy environment. Two users may use their own phones to talk with each other more easily. In this case, the phones of the users may exchange voice data via a network. In the case of a voice call through a network, a delay of the call may occur due to a network delay and the like. In this case, the two individuals may experience a voice delay although the two individuals are geographically close.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a method for overcoming the above-described limitation in a Bluetooth network environment.

Additional aspects will be set forth in part in the description which follows and, in part, will be apparent from the description, or may be learned by practice of the presented embodiments.

In accordance with an aspect of the disclosure, an electronic device is provided. The electronic device includes an audio reception circuit, an audio output circuit, a communication circuit configured to support Bluetooth communication, a processor operatively connected to the audio reception circuit, the audio output circuit, and the communication circuit, and a memory operatively connected to the processor, wherein the memory stores instructions that, when executed, cause the processor to connect to a first external electronic device by a first communication link using the communication circuit, connect to a second external electronic device by a second communication link using the communication circuit, transmit connection information including information about the first communication link to the second external electronic device via the second communication link, receive first data from the second external electronic device on a first slot for receiving data from the first external electronic device of the first communication link, and transmit second data to the second external electronic device via the first communication link on a second slot for transmitting data to the first external electronic device of the first communication link.

In accordance with another aspect of the disclosure, an electronic device is provided. The electronic device includes an audio reception circuit, an audio output circuit, a communication circuit configured to support Bluetooth communication, a processor operatively connected to the audio reception circuit, the audio output circuit, and the communication circuit, and a memory operatively connected to the processor, wherein the memory stores instructions that, when executed, cause the processor to connect to a first external electronic device by a first communication link using the communication circuit, receive, from the first external electronic device, connection information including information about a second communication link between the first external electronic device and a second external electronic device, transmit first data to the first external electronic device via the second communication link on a first slot for transmission of the second external electronic device of the second communication link, using the connection information, and receive second data from the first external electronic device via the second communication link on a second slot for transmission of the first external electronic device of the second communication link, using the connection information.

In accordance with another aspect of the disclosure, a method for communication of an electronic device is provided. The method includes connecting a first external electronic device with a first communication link based on a Bluetooth protocol, connecting a second external electronic device with a second communication link based on the Bluetooth protocol, transmitting connection information including information about the first communication link to the second external electronic device, receiving first data from the second external electronic device via the first communication link on a first slot of the first communication link for reception from the first external electronic device, and transmitting second data to the second external electronic device via the first communication link on a second slot of the first communication link for transmission to the first external electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
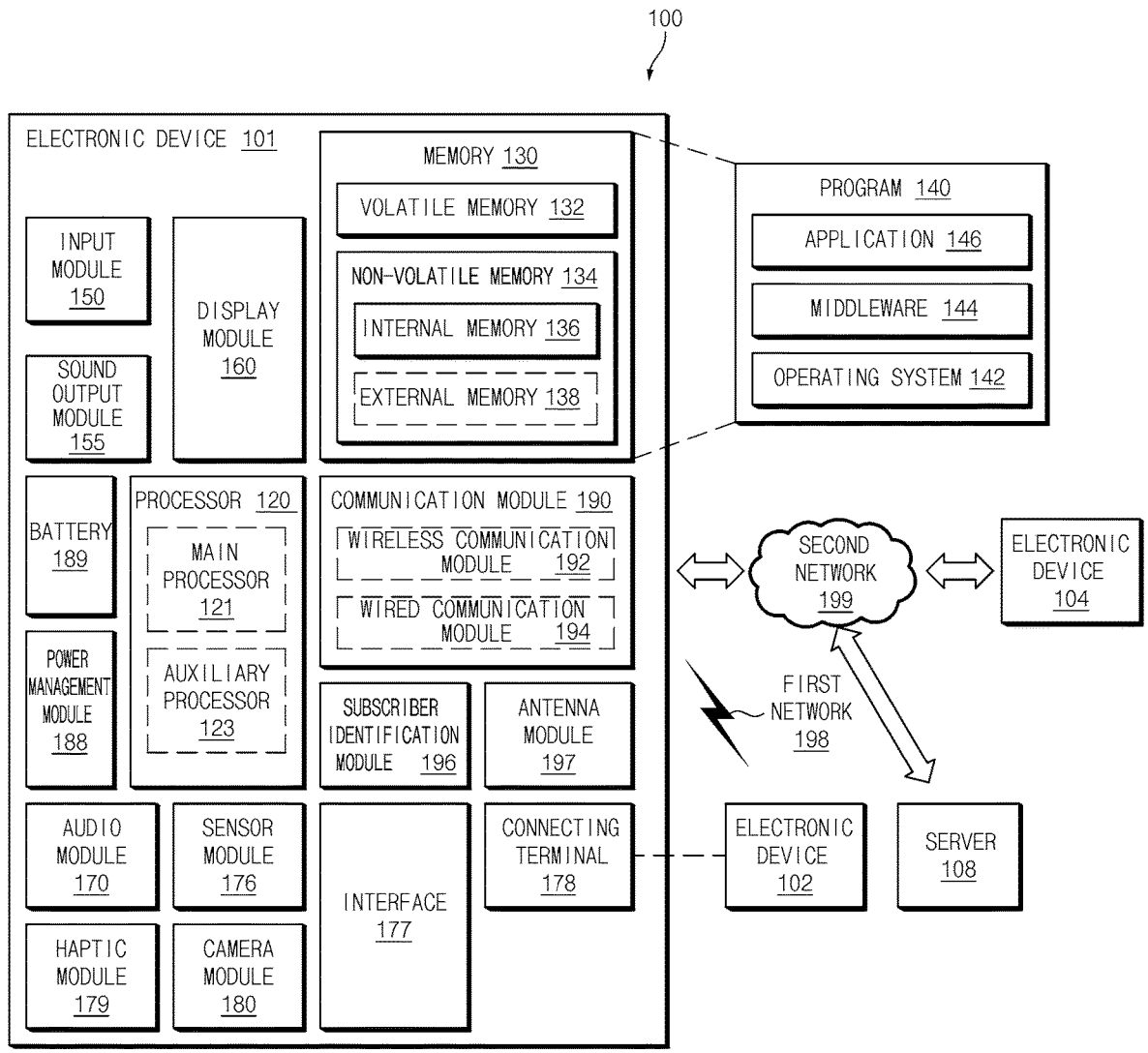
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
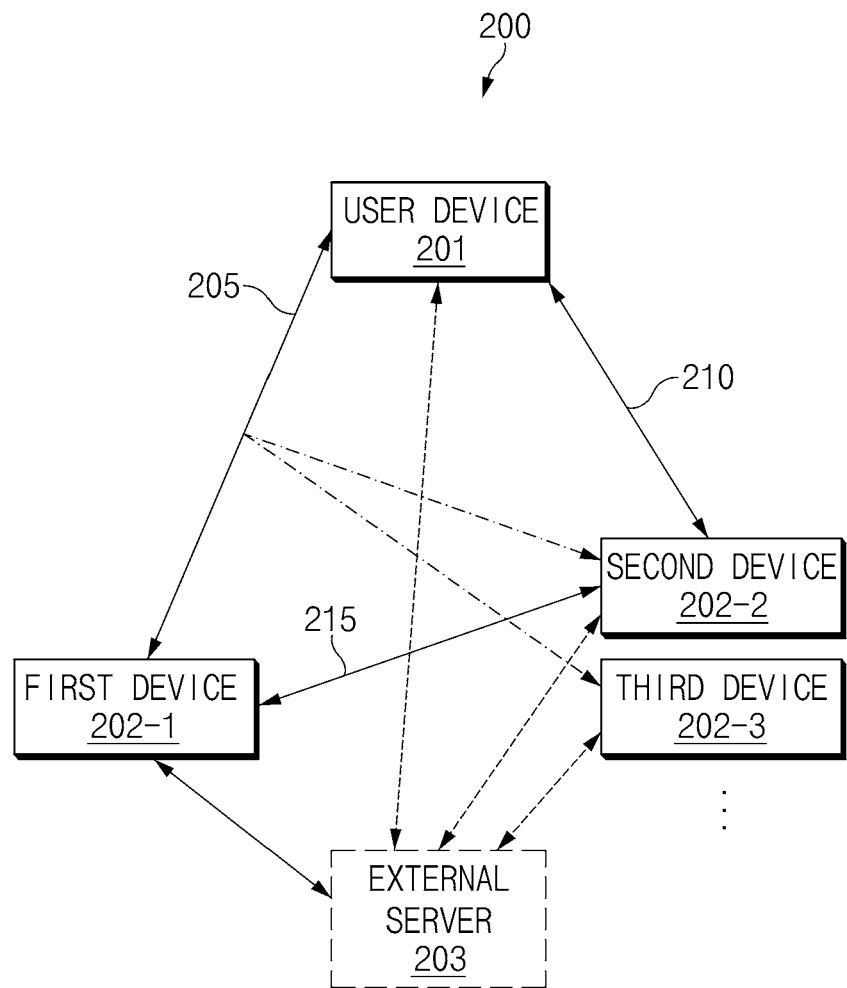
FIG. 2 illustrates a topology of Bluetooth connection between an electronic device and a first external electronic device according to an embodiment of the disclosure.

FIG. 2 illustrates a topology of a Bluetooth network environment according to an embodiment of the disclosure.

Referring to FIG. 2, in a topology a user device 201 and one or more devices 202-1, 202-2, and/or 202-3 included in the topology 200 may include components, at least some of which are the same as or similar to those of the electronic device 101 illustrated in FIG. 1, and may execute functions, at least some of which are the same as or similar to those of the electronic device 101. For example, the user device 201 and the one or more devices 202-1, 202-2, and/or 202-3 may perform wireless communication at a short range according to a Bluetooth network defined by Bluetooth Special Interest Group (SIG). The Bluetooth network may include, for example, a Bluetooth legacy network or a Bluetooth low energy (BLE) network. According to an embodiment, the user device 201 and the one or more devices 202-1, 202-2, and/or 202-3 may perform wireless communication via one or both of the Bluetooth legacy network and the BLE network.

The user device 201 may include, for example, a user equipment such as a smartphone, a tablet, a desktop computer, or a laptop computer, and the one or more devices 202-1, 202-2, and/or 202-3 may include an accessory device such as an earphone, an earphone case, a headset, a speaker, a mouse, a keyboard, or a display device. According to an embodiment, the one or more devices 202-1, 202-2, and/or 202-3 of FIG. 2 may recognize presence of another device (e.g., a first device 202-1, a second device 202-2, and/or a third device 202-3) before connection or may store information (e.g., address information) about another device before connection. For example, in the case of an accessory device (e.g., an earphone) including the first device 202-1 and the second device 202-2, the first device 202-1 and the second device 202-2 may recognize presence of each other before connection or may store address information of each other before connection. According to an embodiment, the user device 201 and the one or more devices 202-1, 202-2, and/or 202-3 may be configured to update address information of each other. For example, the first device 202-1 may update the address information of the second device 202-2 stored in a memory, or the second device 202-2 may update the address information of the first device 202-1 stored in a memory.

According to an embodiment, the user device 201 may serve as a master device, and the one or more devices 202-1, 202-2, and/or 202-3 may serve as slave devices. The number of devices serving as a slave device is not limited to the example illustrated in FIG. 2. According to an embodiment, during an operation in which a link (e.g., 205, 210, and/or 215) between devices are created, it may be determined which device should serve as a master device or a slave device. According to another embodiment, one of the first device 202-1 and the second device 202-2 (e.g., the first device 202-1) may serve as a master device, and the other device (e.g., the second device 202-2) may serve as a slave device.

The master device may control a physical channel. For example, the master device may transmit a data packet, whereas the slave device may transmit a data packet to the master device only after receiving a data packet. For another example, a channel resource (e.g., frequency hopping channel) for transmitting a data packet may be generated based on a clock of the master device. In the Bluetooth legacy network, a time resource (e.g., time slot) may be determined based on a clock of the master device. The time slot may be, for example, 625 microseconds (µs). In the BLE network, the master device and the slave device may transmit data packets at every specified interval, and, if data packets are received, may respond after a specified time (e.g., the inter frame space (T_IFS), about 150 µs).

According to an embodiment, the user device 201 may transmit a data packet including content such as text, audio, image, or video to the one or more devices 202-1, 202-2, and/or 202-3. Not only the user device 201 but also at least one of the devices 202-1, 202-2, and/or 202-3 may transmit a data packet according to the type of content included in a data packet. For example, only the user device 201 may transmit a data packet including content via a created link to the devices 202-1, 202-2, and/or 202-3 when music is played back on the user device 201, whereas, not only the user device 201 but also at least one of the devices 202-1, 202-2, and/or 202-3 may transmit a data packet including content (e.g., audio data) via a created link to the user device 201 when a call is performed on the user device 201. When only the user device 201 transmits a data packet, the user device 201 may be referred to as a source device, and the one or more devices 202-1, 202-2, and/or 202-3 may be referred to as sink devices.

When the user device 201 creates (or establishes) a plurality of links with the one or more devices 202-1, 202-2, and/or 202-3 in order to transmit a data packet, the resource consumption and/or power consumption of the user device 201 may increase. Therefore, the user device 201 may form only a first link 205 with the first device 202-1, and may transmit a data packet to the first device 202-1 via the first link 205. In this case, at least one of other devices (e.g., the second device 202-2 and/or third device 202-3) may monitor the first link 205 in order to receive the data packet including content transmitted from the user device 201. In this case, the user device 201 may be referred to as a device under test (DUT), the first device 202-1 may be referred to as a primary earbud or primary equipment (PE), and each of the at least one of other devices (e.g., the second device 202-2 and/or third device 202-3) may be referred to a secondary earbud or secondary equipment (SE).

According to an embodiment, the first device 202-1 may create a third link 215 with the second device 202-2. The first device 202-1 may transmit information associated with the first link 205 to the second device 202-2 via the third link 215 such that the second device 202-2 may monitor the first link 205 and may transmit a response message to the user device 201. Hereinafter, the term "monitoring" may represent a state of attempting to receive at least a portion of packets transmitted via a corresponding link or a state capable of receiving at least a portion of packets. For example, when the second device 202-2 monitors the first link 205, the second device 202-2 may receive or attempt to receive at least a portion of packets transmitted by the user device 201 or the first device 202-1 (e.g., electronic devices forming the first link 205) via the first link 205. In this case, the user device 201 may recognize the second device 202-2 using the second link 210, but may not recognize the presence of the second device 202-2 via the first link 205. The information associated with the first link 205 may include address information (e.g., the Bluetooth address of the master device of the first link 205, the Bluetooth address of the user device 201, and/or the Bluetooth address of the first device 202-1), piconet (e.g., topology 200) clock information (e.g., clock native (CLKN) of the master device of the first link 205), logical transport (LT) address information (e.g., information allocated by the master device of the first link 205), used channel map information, link key information, service discovery protocol (SDP) information (e.g., service and/or profile information associated with the first link 205), and/or supported feature information. The information associated with the first link 205 may further include, for example, an extended inquiry response (EIR) packet. The EIR packet may include resource control information about the first link 205 and/or information about a manufacturer. The second device 202-2 may determine a hopping channel (or frequency hopping channel) of the first link 205 through address information and clock information, and may decrypt an encrypted data packet through the link key information. The second device 202-2 may generate an access code (or channel access code) and address information (e.g., LT address information) corresponding to the first link 205 based on the information associated with the first link 205, and may transmit a response message including the generated access code and address information to the user device 201. In this case, the user device 201 may determine whether to retransmit a data packet based on the response message transmitted from the second device 202-2 even if a link with the second device 202-2 is not created.

According to another embodiment, if the first device 202-1 and the second device 202-2 are devices that support the same user account or a similar user account (e.g., a family account), the first device 202-1 and the second device 202-2 may share the information associated with the first link 205 through an external device (e.g., an external server 203) interworking with the first device 202-1 or the second device 202-2 through the same or similar user account. The topology 200 may further include, for example, the external server 203. In an embodiment, the third device 202-3 may also be a device that supports the same user account as or similar account (e.g., family account) to that of the first device 202-1. For example, the first device 202-1 may transmit the information associated with the first link 205 to the external server 203, and the external server 203 may transmit the information associated with the first link 205 to the second device 202-2 and/or the third device 202-3. When a request is received, for example, from the second device 202-2 and/or the third device 202-3, the external server 203 may transmit information (e.g., the information associated with the first link 205) received from the first device 202-1 and/or the user device 201 to the second device 202-2 and/or the third device 202-3. When the request is received from the second device 202-2 and/or the third device 202-3, the external server 203 may request the first device 202-1 and/or the user device 201 to transmit the information associated with the first link 205, and may receive the information associated with the first link 205 from the first device 202-1 and/or the user device 201. When the request is received from the second device 202-2 and/or the third device 202-3, the external server 203 may transmit the information associated with the first link 205, which is stored in the external server 203, to the second device 202-2 and/or the third device 202-3.

According to another embodiment, the second device 202-2 may be allowed to share the information associated with the first link 205 with the user device 201. For example, the user device 201 may transmit the information associated with the first link 205 to the second device 202-2 via the second link 210. For example, after transmitting the information associated with the first link 205, the user device 201 may release the second link 210.

Figure 3:
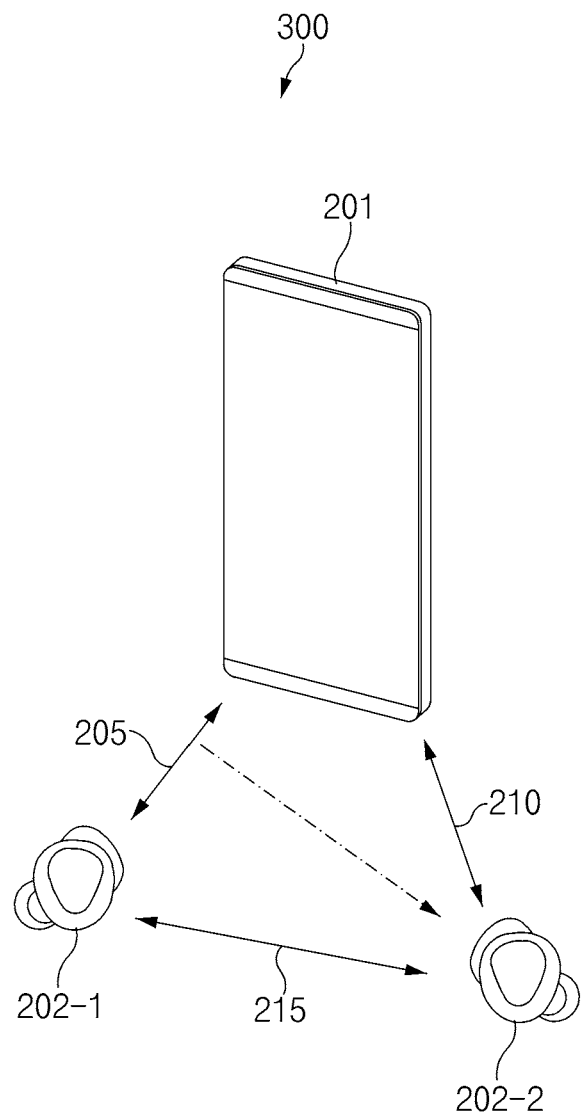
FIG. 3 illustrates electronic devices of a Bluetooth network according to an embodiment of the disclosure.

FIG. 3 illustrates electronic devices of a Bluetooth network according to an embodiment of the disclosure.

Referring to FIG. 3, in a Bluetooth network 300, the user device 201 may create the first link 205 with the first device 202-1, and may create the second link 210 with the second device 202-2. The first device 202-1 and the second device 202-2 may create the third link 215.

According to an embodiment, the second device 202-2 may monitor the first link 205 using information associated with the first link 205. For example, the second device 202-2 may monitor the first link 205 by receiving the information associated with the first link 205 from the first device 202-1 via the third link 215. For example, the second device 202-2 may receive the information associated with the first link 205 from an external server (not shown). For example, the second device 202-2 may receive the information associated with the first link 205 from the user device 201 via the second link 210. The second device 202-2 may obtain audio data exchanged between the user device 201 and the first device 202-1 by monitoring the first link 205.

Referring to FIG. 3, for example, the user device 201 may be a portable electronic device (e.g., a smartphone). For example, the first device 202-1 and/or the second device 202-2 may be a wireless earphone or wireless earbud. For example, the user device 201 may transmit audio data to the first device 202-1 via the first link 205. The first device 202-1 and the second device 202-2 may be configured to output the audio data received from the user device 201 via the first link 205. For another example, when performing a voice call, the first device 202-1 and/or the second device 202-2 may receive audio data from the user device 201, and may transmit, to the user device 201, audio data obtained through a microphone (not shown) of the first device 202-1 and/or the second device 202-2. In the example of FIG. 3, the user device 201 may obtain audio data from the first device 202-1 and/or the second device 202-2. For example, the user device 201 may perform a call (e.g., a voice call or video call) with an external electronic device (not shown). In this case, the user device 201 may obtain audio data to perform a call. For another example, the user device 201 may obtain audio data in response to execution of a specified application (e.g., voice chatting, messenger, voice assistant, or voice recording).

According to an embodiment, the first device 202-1 and the second device 202-2 may exchange audio data. With regard to the audio data exchange between the first device 202-1 and the second device 202-2, the following descriptions related to FIGS. 7 to 17 may be referenced. While the first device 202-1 and the second device 202-2 are exchanging audio data, the user device 201 may operate in a transmission restriction mode. For example, in the transmission restriction mode, the user device 201 may be configured to stop data transmission via a Bluetooth network. With regard to the operation of the user device 201 in the transmission restriction mode, the following descriptions related to FIGS. 7 to 17 may be referenced.

In an embodiment, the user device 201 may create the first link 205 based on a synchronous connection protocol. For example, the synchronous connection protocol may include a protocol (e.g., protocol that supports HPF) that supports real-time audio data exchange. The user device 201 may create a synchronous connection in order to exchange audio data in real time. The user device 201 may create a link for exchanging audio data in real time with the first device 202-1 via the first link 205. For example, the user device 201 may create a synchronous connection oriented (SCO) link or extended SCO (eSCO) link via the first link 205. When creating the eSCO link, the user device 201 and the first device 202-1 may negotiate various parameters associated with the eSCO link. For example, the parameters associated with the eSCO link may include a transmission/reception period (e.g., interval eSCO (TeSCO)), retransmission window (retransmit window eSCO (WeSCO)), and/or packet type. The transmission/reception period TeSCO may include information about a time period at which the user device 201 and the first device 202-1 exchange data. For example, the transmission/reception period may include a plurality of time slots.

For example, in the case of the eSCO link, the transmission/reception period may be configured so that a master device (e.g., the user device 201) and slave device (e.g., the first device 202-1) of the eSCO link may exchange data within a time corresponding to one TeSCO. For example, the transmission/reception period may be configured so that a first slot of the transmission/reception period is used for data transmission of the master device, and a second slot is used for data transmission of the slave device. For another example, the transmission/reception period may be configured so that first N number of slots (e.g., N is 1 or 3) of the transmission/reception period are used for data transmission of the master device, and a slot following the N number of slots is used for data transmission of the slave device.

For example, information about the retransmission window WeSCO may include information (e.g., the number of slots) about a length of a time interval used for data retransmission within the transmission/reception period TeSCO. The retransmission window may include at least one time slot following a time slot for initial data transmission/reception of the master device and the slave device within one transmission/reception period. For example, when the master device and the slave device use first and second time slots of the transmission/reception period, the retransmission window may start from a third time slot. If negative acknowledgement (NACK) is indicated from the slave device or a response message is not received within a specified time after data transmission in response to the data transmitted from the master device to the slave device, the master device may attempt to retransmit data using a time slot configured for the master device within the WeSCO. For another example, the slave device may also attempt to retransmit data using a time slot configured for the slave device within the WeSCO. When re-reception of data fails within the WeSCO, the master device and the slave device may be configured to attempt to exchange new data rather than to retransmit existing data in a next transmission/reception period. For example, a value of an automatic repeat request number (ARQN) field of a header of a packet indicating negative acknowledgement may be set to 0, and a value of the ARQN field of a header of a packing indicating positive acknowledgement may be set to 1.

In an embodiment, the user device 201 may create the first link 205 based on an asynchronous connection protocol. For example, the asynchronous connection protocol may include a serial port profile (SPP) or a profile (e.g., advanced audio distribution profile (A2DP)) using an asynchronous connection-less (ACL) protocol.

The descriptions of the first link 205 provided above with reference to FIG. 3 are related to a typical Bluetooth protocol, and may be similarly applied to the second link 210 and/or the third link 215.

Hereinafter, various embodiments of the disclosure will be described with reference to FIGS. 4 to 17. Hereinafter, the first device 202-1 and the second device 202-2 may exchange data. For example, the first device 202-1 and the second device 202-2 may exchange data using the first link 205. For another example, the first device 202-1 and the second device 202-2 may exchange data using the third link 215. For another example, the first device 202-1 and the second device 202-2 may exchange data via the user device 201.

Figure 4:
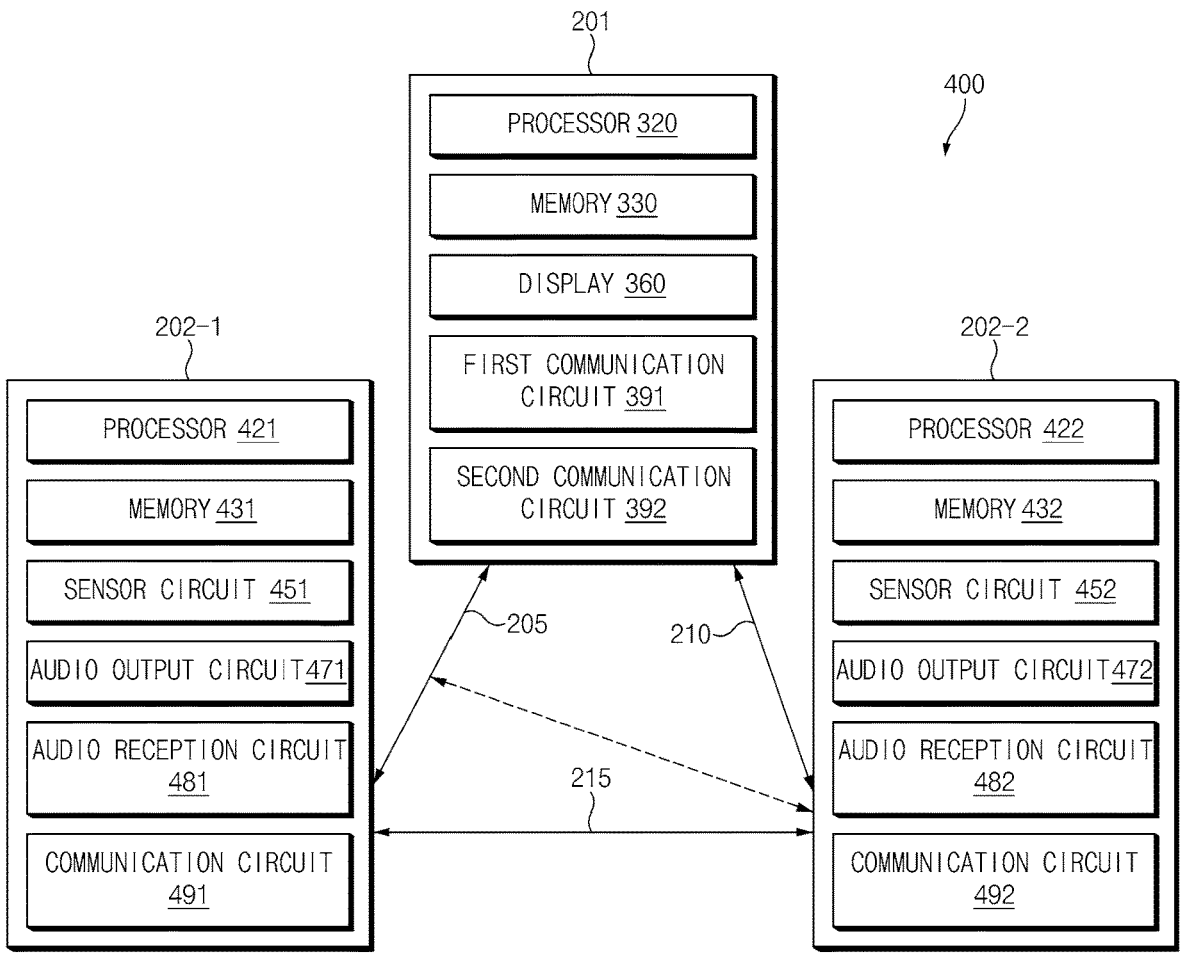
FIG. 4 is a block diagram illustrating electronic devices according to an embodiment of the disclosure.

FIG. 4 is a block diagram illustrating electronic devices according to an embodiment of the disclosure.

Referring to FIG. 4, various electronic devices (e.g., the user device 201, the first device 202-1, and the second device 202-2) disclosed in the disclosure may include at least some of the components of the electronic device (e.g., the electronic device 101 of FIG. 1) described above with reference to FIG. 1. For example, the configuration of the electronic devices of FIG. 4 may be referred to as a Bluetooth system 400.

According to various embodiments, the user device 201 may include a processor 320 (e.g., the processor 120 of FIG. 1), a memory 330 (e.g., the memory 130 of FIG. 1), a display 360 (e.g., the display module 160 of FIG. 1), a first communication circuit 391 (e.g., the communication module 190 of FIG. 1), and/or a second communication circuit 392 (e.g., the communication module 190 of FIG. 1). The processor 320 may be operatively connected to the memory 330, the display 360, the first communication circuit 391, and the second communication circuit 392. The memory 330 may store one or more instructions that, when executed, cause the processor 320 to perform various operations of the user device 201. The second communication circuit 392 may be configured to support wireless communication based on a Bluetooth protocol (e.g., legacy Bluetooth and/or BLE). The first communication circuit 391 may be configured to support communication based on a wireless communication standard (e.g., cellular and/or wireless fidelity (Wi-Fi)) except for a Bluetooth protocol. The user device 201 may further include a configuration not illustrated in FIG. 4. For example, the user device 201 may further include an audio input/output device (e.g., the audio module 170 of FIG. 1) and/or a housing.

The user device 201 may be connected to the first device 202-1 via the first link 205. For example, the user device 201 and the first device 202-1 may communicate on a time slot basis, the time slot being configured based on a clock of the master device of the first link 205. One time slot may be configured so that the master device may transmit data to the slave device or the slave device may transmit data to the master device. One time slot may have a length of 625 μs (microseconds).

According to an embodiment, the user device 201 may be connected to the second device 202-2 via the second link 210. For example, the user device 201 may establish the second link 210 after connecting to the first device 202-1. As described above with reference to FIGS. 2 and 3, the user device 201 may transfer the information associated with the first link 205 to the second device 202-2 via the second link 210. According to an embodiment, the second link 210 may be omitted. In this case, the second device 202-2 may receive the information associated with the first link 205 from the first device 202-1 or an external server (e.g., the external server 203 of FIG. 2).

According to an embodiment, the first device 202-1 may include a processor 421 (e.g., the processor 120 of FIG. 1), a memory 431 (e.g., the memory 130 of FIG. 1), a sensor circuit 451 (e.g., the sensor module 176 of FIG. 1), an audio output circuit 471 (e.g., the audio module 170 of FIG. 1), an audio reception circuit 481 (e.g., the audio module 170 of FIG. 1), and/or a communication circuit 491 (e.g., the communication module 190 of FIG. 1). The processor 421 may be operatively connected to the memory 431, the sensor circuit 451, the audio output circuit 471, the audio reception circuit 481, and the communication circuit 491. The sensor circuit 451 may sense information about a wearing state of the first device 202-1 and/or biometric information about a wearer. For example, the sensor circuit 451 may include a proximity sensor for sensing the wearing state and/or a heart rate sensor for sensing the biometric information. The audio output circuit 471 may be configured to output a sound. The audio reception circuit 481 may include one or more microphones. In an embodiment, the microphones may correspond to different audio reception paths. For example, in the case where the audio reception circuit 481 includes a first microphone and a second microphone, an audio signal obtained by the first microphone and an audio signal obtained by the second microphone may be referred to as different audio channels. The processor 421 may obtain audio data using at least one microphone among a plurality of microphones connected to the audio reception circuit 481. The processor 421, for example, may dynamically select or determine at least one microphone for obtaining audio data among the plurality of microphones. The processor 421 may obtain audio data by performing beamforming using the plurality of microphones. The memory 431 may store one or more instructions that, when execute, cause the processor 421 to perform various operations of the first device 202-1. The first device 202-1 may further include a configuration not illustrated in FIG. 4. For example, the first device 202-1 may further include an indicator (e.g., the display module 160 of FIG. 1), an input interface (e.g., the interface 177 of FIG. 1), and/or a housing.

According to an embodiment, the first device 202-1 may be connected to the second device 202-2 via the third link 215. For example, the first device 202-1 may establish the third link 215 with the second device 202-2. According to an embodiment, the first device 202-1 may share information associated with the first link 205, via the third link 215. The information associated with the first link 205 may include address information (e.g., the Bluetooth address of the master device of the first link 205, the Bluetooth address of the user device 201, and/or the Bluetooth address of the first device 202-1), Piconet (e.g., topology 200) clock information (e.g., clock native (CLKN) of the master device of the first link 205), logical transport (LT) address information (e.g., information allocated by the master device of the first link 205), used channel map information, link key information, service discovery protocol (SDP) information (e.g., service and/or profile information associated with the first link 205), and/or supported feature information. The information associated with the first link 205 may further include, for example, an extended inquiry response (EIR) packet. The EIR packet may include resource control information about the first link 205 and/or information about a manufacturer. For example, a channel access code (CAC) of the first link 205 may be generated based on a low address part (LAP) of a Bluetooth address of the master device of the first link 205. The CAC may be an access code that is used, after a connection of an associated link is completed, for communication between two electronic devices (e.g., the user device 201 and the first device 202-1) of the link (e.g., the first link 205). The first device 202-1 may transmit the generated CAC and/or the Bluetooth address of the master device of the first link 205 to the second device 202-2 as at least a portion of first link information. In this case, the first device 202-1 may transmit the first link information to the second device 202-2 via the third link 215.

For example, LT_ADDR may be an address allocated by the master device of the first link 205. The first device 202-1 may transmit LT_ADDR to the second device 202-2 as at least a portion of the first link information.

For example, a used channel map may be channel hopping information configured by the master device of the first link 205. The first device 202-1 may transmit the used channel map to the second device 202-2 as at least a portion of the first link information.

For example, clock information may include clock information about the master device and/or slave device of the first link 205. The first device 202-1 may transmit the clock information to the second device 202-2 as at least a portion of the first link information.

According to various embodiments, the second device 202-2 may include a processor 422 (e.g., the processor 120 of FIG. 1), a memory 432 (e.g., the memory 130 of FIG. 1), a sensor circuit 452 (e.g., the sensor module 176 of FIG. 1), an audio output circuit 472 (e.g., the audio module 170 of FIG. 1), an audio reception circuit 482, and/or a communication circuit 492 (e.g., the communication module 190 of FIG. 1). The processor 422 may be operatively connected to the memory 432, the audio output circuit 472, the audio reception circuit 482, and the communication circuit 492. The sensor circuit 452 may sense information about a wearing state of the second device 202-2 and/or biometric information about a wearer. For example, the sensor circuit 452 may include a proximity sensor for sensing the wearing state and/or a heart rate sensor for sensing the biometric information. The audio output circuit 472 may be configured to output a sound. The audio reception circuit 482 may include one or more microphones. In an embodiment, the microphones may correspond to different audio reception paths. For example, in the case where the audio reception circuit 482 includes a first microphone and a second microphone, an audio signal obtained by the first microphone and an audio signal obtained by the second microphone may be referred to as different audio channels. The memory 432 may store one or more instructions that, when execute, cause the processor 422 to perform various operations of the second device 202-2. The second device 202-2 may further include a configuration not illustrated in FIG. 4. For example, the second device 202-2 may further include an indicator (e.g., the display module 160 of FIG. 1), an audio input device (e.g., the audio module 170), an input interface (e.g., the interface 177 of FIG. 1), and/or a housing.

According to an embodiment, the first device 202-1 may include the memory 431, which stores one or more instructions. The one or more instructions, when executed, may cause the processor 421 to connect the user device 201 with the first link 205 using the communication circuit 491, and connect the second device 202-2 with the third link 215 using the communication circuit 491.

The instructions, when executed, may cause the processor 421 to transmit connection information including information about the first link 205 to the second device 202-2. The one or more instructions, when executed, may cause the processor 421 to receive, from the second device 202-2, first data on a first slot for receiving data from the user device 201 of the first link 205, and transmit, to the second device 202-2, second data via the first link 205 on a second slot for transmitting data to the user device 201 of the first link 205.

The instructions, when executed, may cause the processor 421 to obtain the second data using the audio reception circuit 481 and output the first data using the audio output circuit 471. For example, the first data may include audio data obtained by the second device 202-2.

The instructions, when executed, may cause the processor 421 to transmit/receive data to/from the second device 202-2 at a specified period (e.g., TeSCO) via the first link 205. A time interval corresponding to the specified period may include a plurality of slots. The instructions, when executed, may cause the processor 421 to receive data from the second device 202-2 via the first link 205 on at least one odd-numbered slot among the plurality of slots, and transmit data to the second device 202-2 via the first link 205 on at least one even-numbered slot among the plurality of slots.

For example, the connection information may include at least one of a channel access code of the first link 205 or the Bluetooth address of the user device 201.

The instructions, when executed, may cause the processor 421 to receive, from the user device 201, a termination signal indicating termination of communication with the second device 202-2, and communicate with the user device 201 via the first link 205 in response to reception of the termination signal.

For example, the first link 205 may be an enhanced synchronous connection oriented (eSCO) link.

According to an embodiment, the memory 432 of the second device 202-2 may store instructions that, when executed, cause the processor 422 to perform the operations described below. The instructions, when executed, may cause the processor 422 to connect the first device 202-1 with the third link 215 using the communication circuit 492, receive, from the first device 202-1, connection information including information about the first link 205 between the first device 202-1 and the user device 201, transmit first data to the first device 202-1 via the first link 205 on a first slot for transmission of the user device 201 of the first link 205 using the connection information, and receive, from the first device 202-1, second data via the first link 205 on a second slot for transmission of the first device 202-1 of the first link 205.

The instructions, when executed, may cause the processor 422 to obtain the first data using the audio reception circuit 482 and output the second data using the audio output circuit 472.

The instructions, when executed, may cause the processor 422 to estimate a radio resource of the first link 205 using the connection information.

The instructions, when executed, may cause the processor 422 to transmit/receive data to/from the user device 201 at a specified period (e.g., TeSCO) via the first link 205. A time interval corresponding to the specified period may include a plurality of slots.

The instructions, when executed, may cause the processor 422 to transmit data to the first device 202-1 via the first link 205 on at least one odd-numbered slot among the plurality of slots, and receive data from the first device 202-1 via the first link 205 on at least one even-numbered slot among the plurality of slots.

For example, the connection information may include at least one of a channel access code of the first link 205 or the Bluetooth address of the user device 201. The first link 205 may be an enhanced synchronous connection oriented (eSCO) link.

Figure 5:
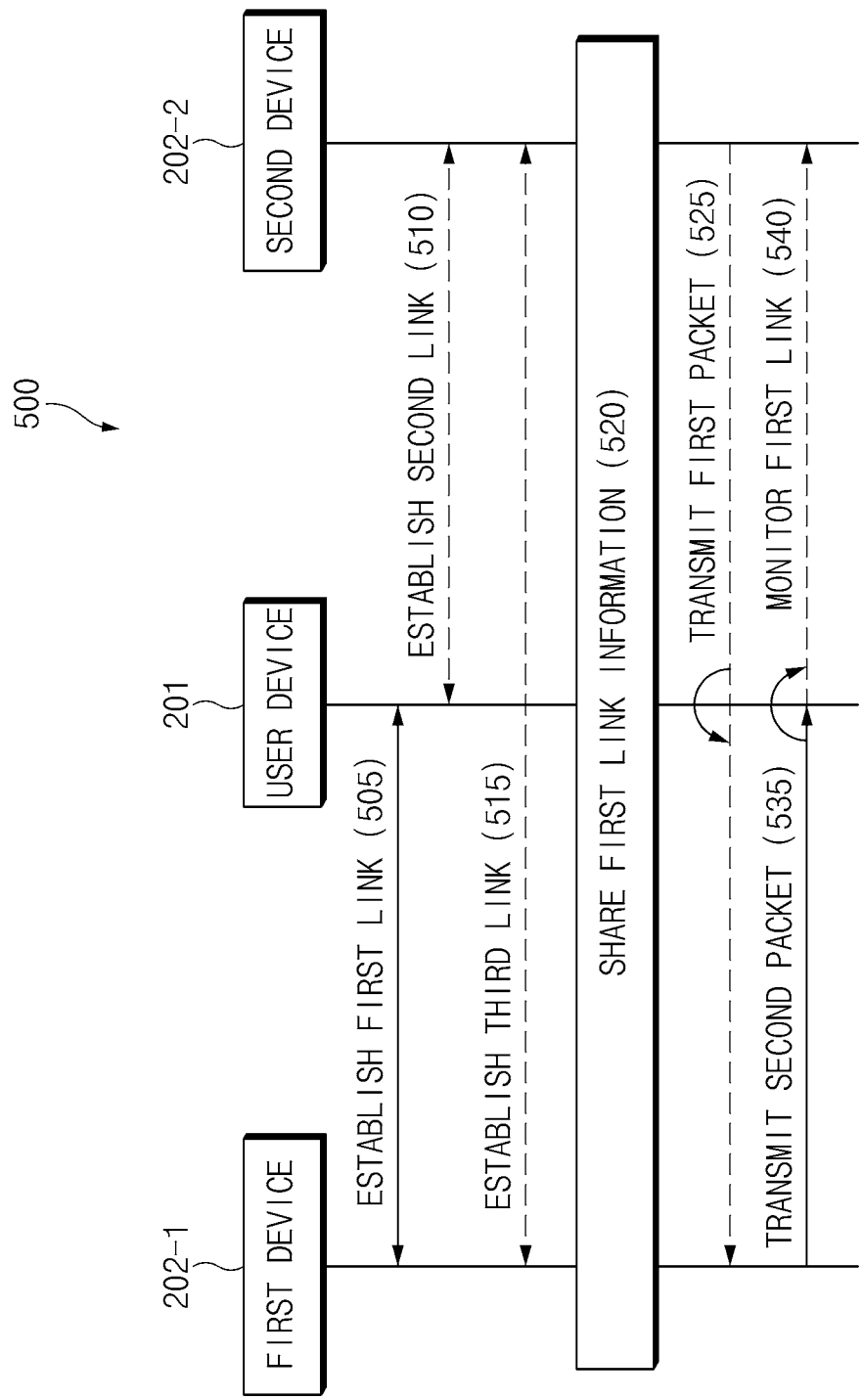
FIG. 5 is a signal flow diagram for communication between electronic devices according to an embodiment of the disclosure.

FIG. 5 is a signal flow diagram illustrating a signal flow for communication between electronic devices according to an embodiment of the disclosure.

Referring to FIG. 5, in a signal flow 500, in operation 505, the user device 201 may establish a first link (e.g., the first link 205 of FIG. 2) with the first device 202-1. According to an embodiment, the user device 201 may be connected to the first device 202-1 via the first link 205. For example, the first link 205 may be an eSCO link.

In operation 510, the user device 201 may establish a second link (e.g., the second link 210 of FIG. 2) with the second device 202-2. According to an embodiment, the user device 201 may be connected to the second device 202-2 via the second link 210. For example, the user device 201 may receive information (e.g., Bluetooth information) about the second device 202-2 from the first device 202-1, and may establish the second link 210 with the second device 202-2 using the received information about the second device 202-2.

The establishment of the second link 210 is exemplary, and embodiments of the disclosure are not limited thereto. For example, the user device 201 and the second device 202-2 may establish the second link 210 before the establishment of the first link 205 (e.g., operation 505). For example, the second link 210 may be released after sharing first link information (e.g., operation 520). For another example, the establishment of the second link 210 (e.g., operation 510) may be skipped. For example, operation 505 may be performed based on an input to the user device 201.

Figure 6:
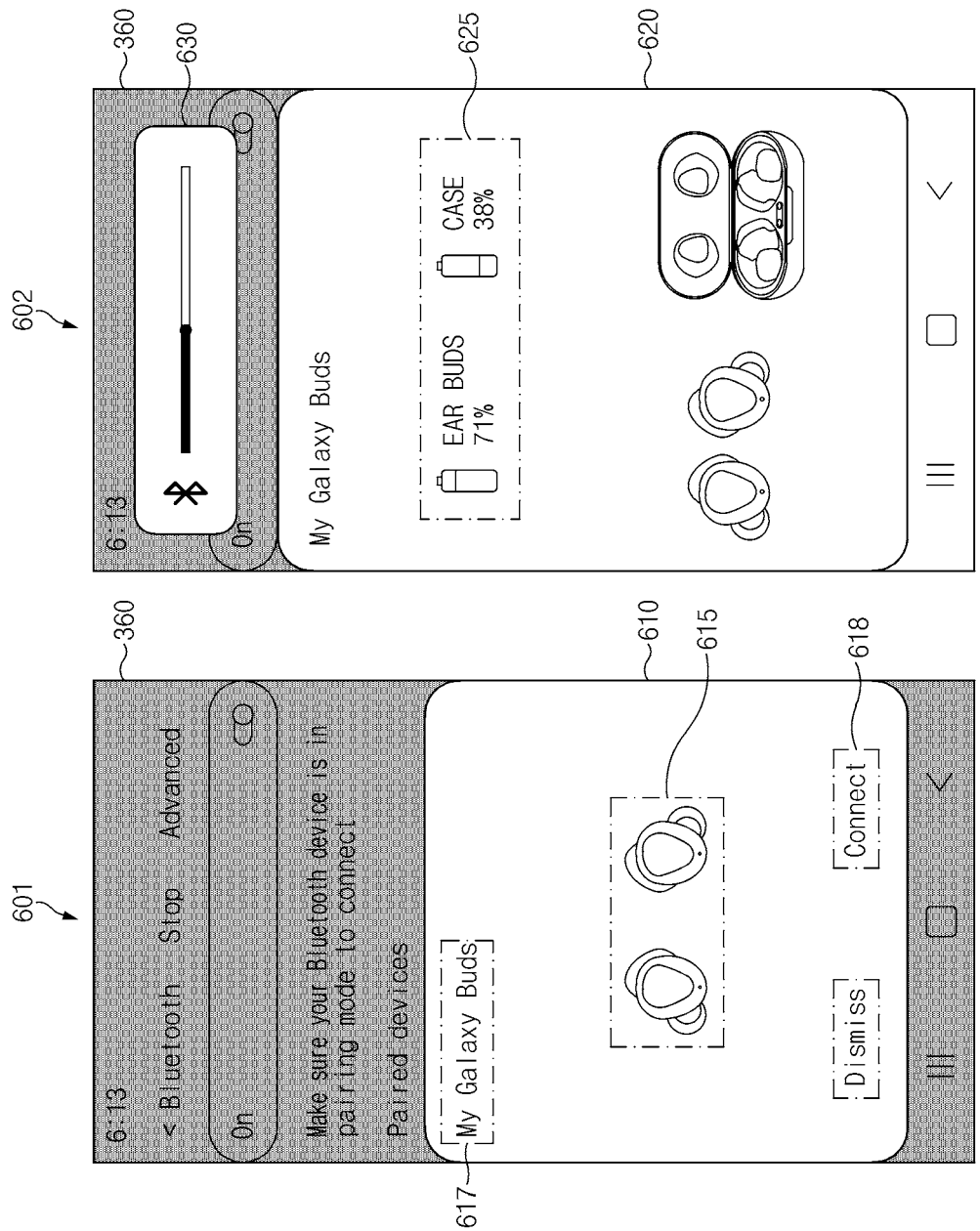
FIG. 6 is a diagram illustrating user interfaces (UI) showing connections of devices in a Bluetooth network environment according to an embodiment of the disclosure.

FIG. 6 is a diagram illustrating user interfaces (UI) showing connections of devices in the Bluetooth network environment according to an embodiment of the disclosure.

FIG. 6 illustrates an embodiment in which the first device 202-1 and the second device 202-2 are configured as a set, but the same principle may be applied to user interface showing only that the user device 201 is connected with the first device 202-1.

Referring to FIG. 6, with regard to reference numeral 601, the user device 201 may recognize the first device 202-1 by receiving an advertising signal transmitted from the first device 202-1, and may output, through the display 360 of the user device 201, a first user interface 610 for notifying the recognized first device 202-1 and the second device 202-2 to a user. For example, the first device 202-1 and the second device 202-2 may constitute one set or one pair. The user of the user device 201 may recognize the first device 202-1 and the second device 202-2 as one electronic device.

The first user interface 610 may include, for example, at least one of an image 615 showing shapes of the first device 202-1 and the second device 202-2 or a text 617 indicating the device names (e.g., My Galaxy Buds) of the first device 202-1 and the second device 202-2. For another example, although not illustrated in FIG. 6, the first user interface 610 may indicate whether or not the first device 202-1 or the second device 202-2 has a history of being previously connected.

According to an embodiment, the advertising signal may include information for connecting (or pairing) the user device 201 and the first device 202-1. For example, the advertising signal may include at least one of identification information of the first device 202-1, user account information, current pairing information indicating whether or not the first device 202-1 is being paired with another device, a paring list indicating a list of devices with which the first device 202-1 has been previously paired, simultaneous pairing information indicating devices capable of pairing with the first device 202-1 simultaneously, transmission power, sensing area, or battery status information. For another example, if the first device 202-1 forms a set with the second device 202-2, the advertising signal may further include at least one of identification information of the second device 202-2, user account information, current pairing information indicating whether or not the second device 202-2 is being paired with another device, a paring list indicating a list of devices with which the second device 202-2 has been previously paired, simultaneous pairing information indicating devices capable of pairing with the first device 202-1 simultaneously, transmission power, sensing area, or battery status information.

According to an embodiment, the first device 202-1 may transmit the advertising signal through a multicast method or a broadcast method.

According to an embodiment, the first device 202-1 may transmit the advertising signal according to a specified condition. For example, the first device 202-1 may transmit the advertising signal in response to detecting that the case in which the first device 202-1 is stored is opened. For another example, the first device 202-1 may transmit the advertising signal in response to supply of power or reception of a user input. For another example, the first device 202-1 may transmit the advertising signal every specified period.

According to an embodiment, the user device 201 may establish (e.g., operation 505 of FIG. 5) the first link (e.g., the first link 205 of FIG. 2) with the first device 202-1, in response to reception of a user input to a connection UI 618 requesting connection with the first device 202-1 or automatically without the user input. According to an embodiment, the user device 201 and the first device 202-1 may establish the first link 205 according to a procedure based on a Bluetooth standard. For example, the user device 201 and the first device 202-1 may perform a baseband page procedure for recognizing a counterpart device, a link manager protocol (LMP) procedure for identifying an LMP version, a clock offset, and/or supported functions (e.g., supported features), a host request/response procedure for verifying connection, an authentication procedure for confirming whether or not the counterpart device is trustable, an encryption procedure, and/or a setup complete procedure for notifying a host of completion of connection (e.g., the first link 205).

Once the first link 205 is established, as indicated by reference numeral 602, the user device 201 may output, through the display 360, a second user interface 620 indicating that the first device 202-1 is connected to the user device 201. The user device 201 may display an image 630 indicating volume values configured to the first device 202-1 and the second device 202-2. The second user interface 620 may further include, for example, an image 625 showing battery statuses of the first device 202-1, the second device 202-2, and a case. The second user interface 620 illustrated in FIG. 6 is exemplary, and embodiments of the disclosure are not limited thereto. According to an embodiment, the image 625 of FIG. 6 may be an image individually showing battery statuses of the first device 202-1 and the second device 202-2. The second user interface 620 may further include battery information about a case of the first device 202-1 and the second device 202-2.

Although not illustrated in FIG. 6, according to an embodiment, if the first device 202-1 is discovered while the user device 201 is already connected to an external device other than the first device 202-1 and the second device 202-2, the user device 201 may transmit, to the first device 202-1 or the second device 202-2, information about a link that is already connected such that the first device 202-1 or the second device 202-2 may monitor the link that is already connected between the user device 201 and the external device. In this case, the first user interface 610 may include information indicating that the first device 202-1 or the second device 202-2 may be added. If a user input requesting addition of the first device 202-1 or the second device 202-2 is received, the user device 201 may transmit, to the first device 202-1 or the second device 202-2, the information about the link that is already connected.

Referring back to FIG. 5, in operation 515, the first device 202-1 and the second device 202-2 may create the third link (e.g., the third link 215 of FIG. 2). The creation of the third link 215 is exemplary, and various embodiments of the disclosure are not limited thereto. For example, the first device 202-1 and the second device 202-2 may create the third link 215 before the establishment of the first link 205 (e.g., operation 505). For another example, the first device 202-1 and the second device 202-2 may establish the third link 215 before the establishment of the second link 210 (e.g., operation 510). For another example, the first device 202-1 and the second device 202-2 may establish the third link 215 substantially simultaneously with the establishment of the first link 205 or the establishment of the second link 210. For another example, the establishment of the third link 215 (e.g., operation 515) may be skipped, and, in this case, the first link information (e.g., operation 520) may be shared with the second device 202-2 via an external server (not shown).

In operation 520, information associated with the first link 205 may be shared with the second device 202-2. According to an embodiment, the user device 201 or the first device 202-1 may share the information associated with the first link 205 with the second device 202-2. For example, the first device 202-1 may transmit, to the second device 202-2, information associated with the first link 205 via the third link 215. For another example, the user device 201 may transmit the information associated with the first link 205 to the second device 202-2 via the second link 210. For another example, the user device 201 or the first device 202-1 may transmit the information associated with the first link 205 to the second device 202-2 via an external server (e.g., the external server 203 of FIG. 2) or via an external electronic device (e.g., charging case of the first device 202-1 and the second device 202-2). According to an embodiment, the user device 201 or the first device 202-1 may determine whether to share the information associated with the first link 205. For example, if the information associated with the first link 205 is determined to be shared, the user device 201 or the first device 202-1 may transmit the information associated with the first link 205 to the second device 202-2. The information associated with the first link 205 may include, for example, at least one of address information, clock information, channel information, SDP result information, information about supported functions, key information, or EIR packets.

If the information associated with the first link 205 is received, the second device 202-2 may receive communication between the first device 202-1 and the user device 201 by monitoring the first link 205. For example, the first device 202-1 and the user device 201 may create, through the first link 205, an eSCO link associated with the first link 205. In this case, the created eSCO link associated with the first link 205 may be referred to as substantially the same link as the first link 205. In the following embodiments, monitoring of the first link 205 may include monitoring of not only the first link 205 but also the eSCO link associated with the first link 205.

In operation 525, the second device 202-2 may transmit a first packet including content to the first device 202-1 via the first link 205. For example, the second device 202-2 may transmit the first packet to the first device 202-1 using a radio resource of the first link 205. For example, the radio resource of the first link 205 used by the second device 202-2 may be a radio resource configured to allow the user device 201 to transmit data to the first device 202-1. The second device 202-2 may estimate a radio resource of the first link 205 using the information associated with the first link 205, and may transmit the first packet using the estimated radio resource. According to an embodiment, the second device 202-2 may obtain audio data using at least one microphone, and may generate the first packet by encoding the obtained audio data.

In operation 535, the first device 202-1 may transmit a second packet including content via the first link 205. According to an embodiment, the first device 202-1 may obtain audio data using at least one microphone, and may generate the second packet by encoding the obtained audio data. In operation 540, the second device 202-2 may monitor the first link 205. The second device 202-2 may receive the second packet by monitoring the first link 205. The monitoring of operation 540 may be referred to as sniffing, shadowing, listening, or snooping.

In the example of FIG. 5, the first device 202-1 may output the audio data of the received first packet via the audio output circuit 471, and the second device 202-2 may output the audio data of the received second packet via the audio output circuit 472. The first device 202-1 and the second device 202-2 may perform real-time voice communication by transmitting/receiving data using the first link 205.

While the first device 202-1 and the second device 202-2 are exchanging data, the user device 201 may not transmit data via the first link 205. For example, the user device 201 may be configured to receive or listen data from the first device 202-1 and the second device 202-2 via the first link 205. The user device 201 may generate a text record that is based on an audio recording or audio data by using the received or listened data.

Although FIG. 5 illustrates that the first device 202-1 and the second device 202-2 communicate using the first link 205, embodiments of the disclosure are not limited thereto. For example, the first device 202-1 and the second device 202-2 may communicate using the second link 210. For another example, as described below with reference to FIGS. 15 to 17, the first device 202-1 and the second device 202-2 may communicate using various links. According to an embodiment, as described below with reference to FIG. 16, the first device 202-1 and the second device 202-2 may transmit/receive packets via the third link 215. In this case, the user device 201 may monitor the third link 215 using information about the third link 215. The establishment of the second link 210 (e.g., operation 510) may be skipped. According to an embodiment, as described below with reference to FIG. 17, the first device 202-1 and the second device 202-2 may transmit/receive packets via the user device 201. In this case, the user device 201 may communicate with the first device 202-1 via the first link 205 and may communicate with the second device 202-2 via the second link 210. The user device 201 may transfer a packet received from the first device 202-1 via the first link 205 to the second device 202-2 via the second link 210, and may transfer a packet received from the second device 202-2 via the second link 210 to the first device 202-1 via the first link 205.

Figure 18:
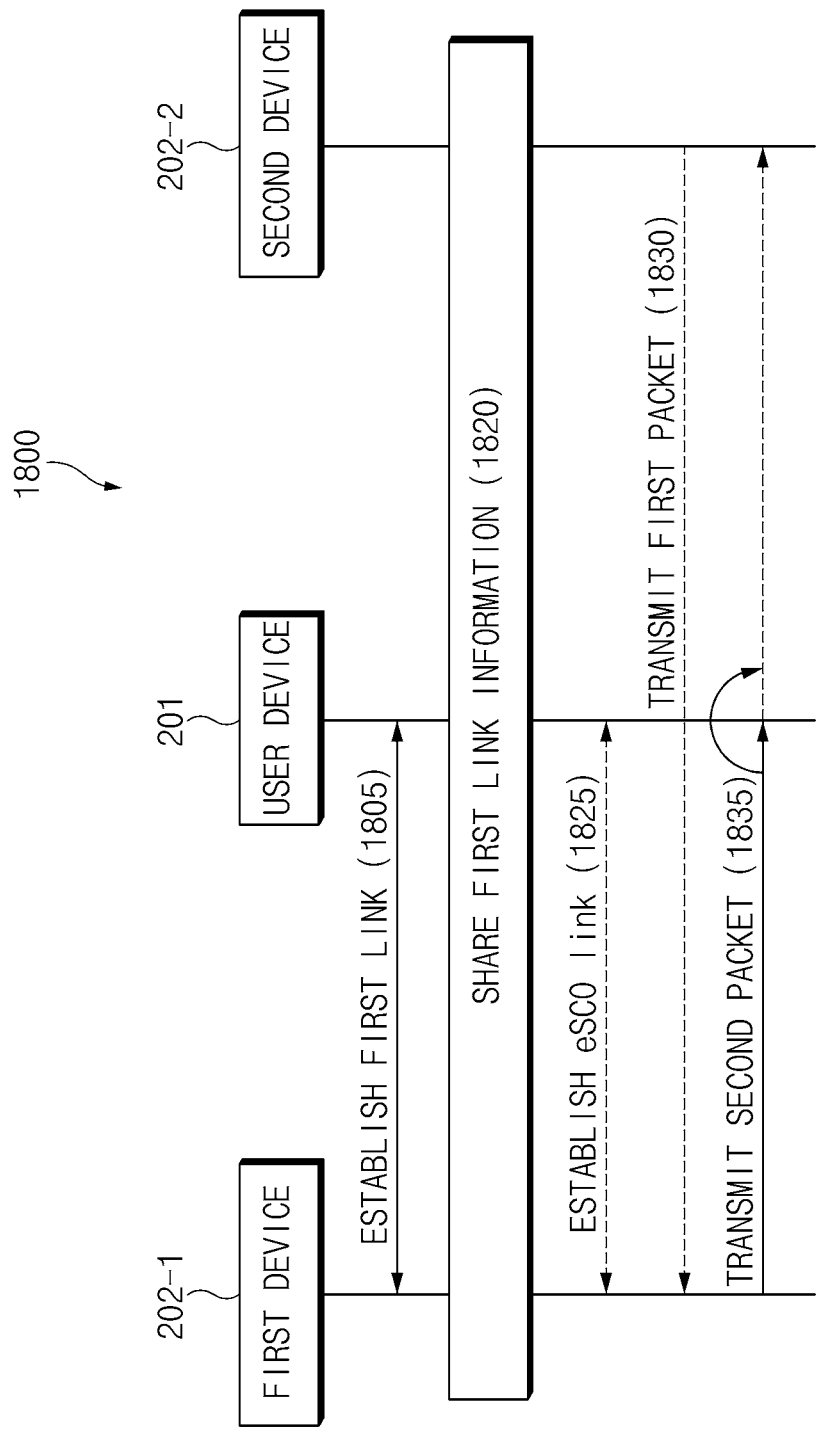
FIG. 18 is a signal flow diagram for communication between electronic devices according to an embodiment of the disclosure.

FIG. 18 is a signal flow diagram illustrating a signal flow for communication between electronic devices according to an embodiment of the disclosure.

Referring to FIG. 18, in a signal flow 1800, in operation 1805, the user device 201 may establish a first link (e.g., the first link 205 of FIG. 2) with the first device 202-1. According to an embodiment, the user device 201 may be connected to the first device 202-1 via the first link 205.

In operation 1820, information associated with the first link 205 may be shared with the second device 202-2. According to an embodiment, the user device 201 or the first device 202-1 may share the information associated with the first link 205 with the second device 202-2. For example, the first device 202-1 may transmit, to the second device 202-2, the information associated with the first link 205 via an additional link (e.g., the third link 215). For another example, the user device 201 may transmit the information associated with the first link 205 to the second device 202-2 via an additional link (e.g., the second link 210). For another example, the user device 201 or the first device 202-1 may transmit the information associated with the first link 205 to the second device 202-2 via an external server (e.g., the external server 203 of FIG. 2) or via an external electronic device (e.g., charging case of the first device 202-1 and the second device 202-2). The information associated with the first link 205 may include, for example, at least one of address information, clock information, channel information, SDP result information, information about supported functions, key information, or EIR packets.

In operation 1825, the first device 202-1 and the user device 201 may establish an eSCO link via the first link 205. For example, the user device 201 and first device 202-1 may establish the eSCO link in response to a specified event (e.g., occurrence of an event for user input or real-time audio data exchange). For example, the eSCO may be referred to as a link associated with the first link 205. Hereinafter, the term "first link" 205 may encompass the first link 205 and the eSCO link associated with the first link 205. If the information associated with the first link 205 is received, the second device 202-2 may receive communication between the first device 202-1 and the user device 201 by monitoring the first link 205. In this case, the second device 202-2 may confirm the establishment of the eSCO link by monitoring the first link 205. The second device 202-2 may communicate with the first device 202-1 via the first link 205. Here, the communication with the first device 202-1 via the first link 205 may include communication via the first link 205 and/or the eSCO link associated with the first link 205.

In operation 1830, the second device 202-2 may transmit a first packet including content to the first device 202-1 via the first link 205 (e.g., eSCO link). For example, the second device 202-2 may transmit the first packet to the first device 202-1 using a radio resource of the first link 205. For example, the radio resource of the first link 205 used by the second device 202-2 may be a radio resource configured to allow the user device 201 to transmit data to the first device 202-1. The second device 202-2 may estimate a radio resource of the first link 205 using the information associated with the first link 205, and may transmit the first packet using the estimated radio resource. According to an embodiment, the second device 202-2 may obtain audio data using at least one microphone, and may generate the first packet by encoding the obtained audio data.

In operation 1835, the first device 202-1 may transmit a second packet including content via the first link 205 (e.g., eSCO link). According to an embodiment, the first device 202-1 may obtain audio data using at least one microphone, and may generate the second packet by encoding the obtained audio data. The second device 202-2 may receive the second packet by monitoring the first link 205. The monitoring may be referred to as sniffing, shadowing, listening, or snooping. The first device 202-1 and the second device 202-2 may perform real-time voice communication by transmitting/receiving data using the first link 205.

While the first device 202-1 and the second device 202-2 are exchanging data, the user device 201 may not transmit data via the first link 205. For example, the user device 201 may be configured to receive or listen data from the first device 202-1 and the second device 202-2 via the first link 205. The user device 201 may generate a text record that is based on an audio recording or audio data by using the received or listened data.

Figure 7:
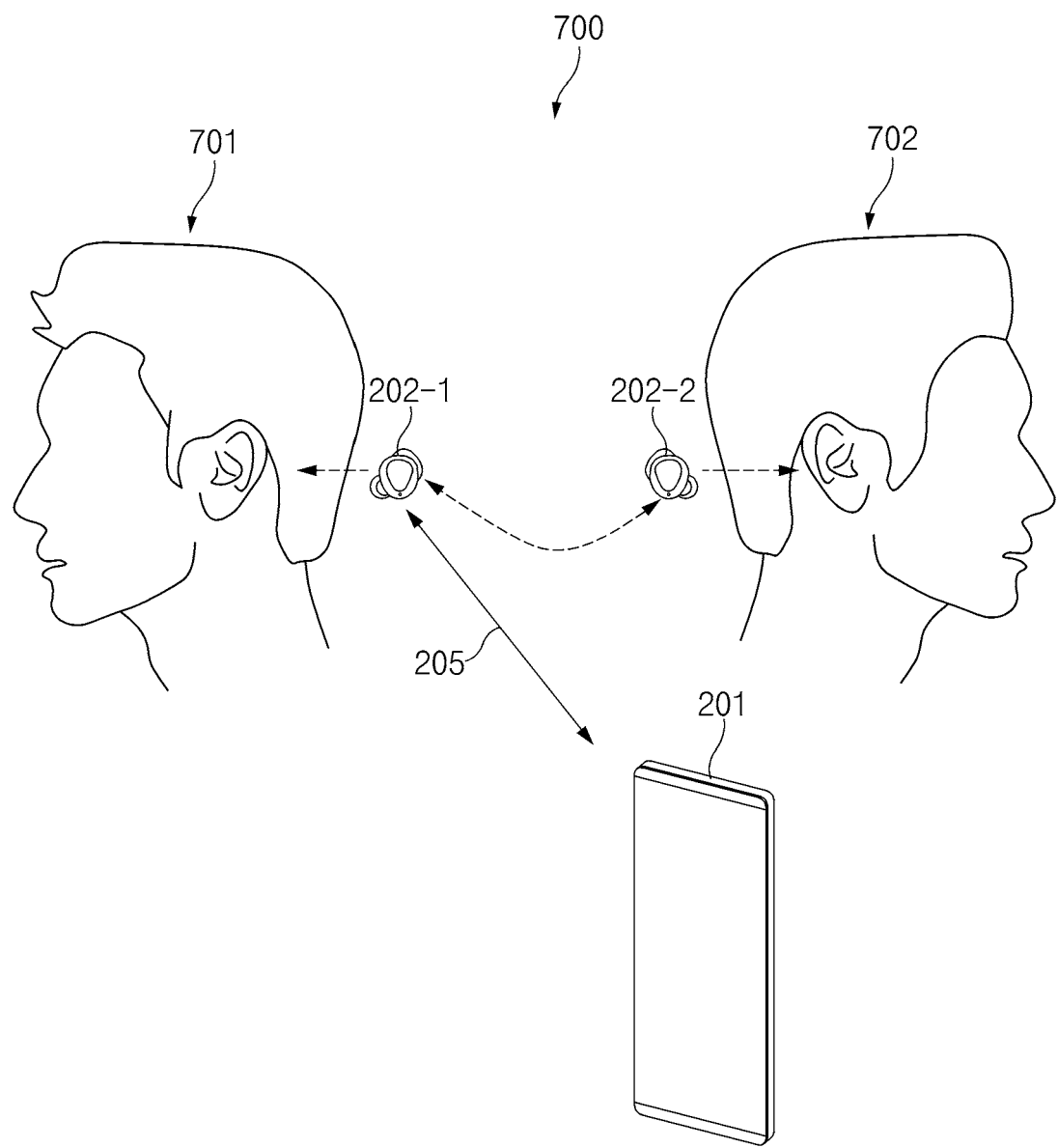
FIG. 7 illustrates a communication environment of a first device and a second device according to an embodiment of the disclosure.

FIG. 7 illustrates a communication environment of the first device and the second device according to an embodiment of the disclosure.

Referring to FIG. 7, in a communication environment 700, the first device 202-1 and the second device 202-2 may communicate via the first link 205. For example, a first user 701 may wear the first device 202-1, and a second user 702 may wear the second device 202-2. The first device 202-1 may obtain a voice of the first user 701 via at least one microphone of the first device 202-1, and may transmit audio data including the voice to the second device 202-2 via the first link 205. The second device 202-2 may obtain a voice of the second user 702 via at least one microphone of the second device 202-2, and may transmit audio data including the voice to the first device 202-1 via the first link 205.

In the following embodiments, the first device 202-1 and the second device 202-2 may exchange voice data via the first link 205 in a first mode. In the first mode, the user device 201 may be configured not to transmit media data via the first link 205. In a second mode, the first device 202-1 and the second device 202-2 may be configured to receive media data from the user device 201 via the first link 205.

According to an embodiment, the first device 202-1, the second device 202-2, and the user device 201 (e.g., the Bluetooth system 400 of FIG. 4) may operate in the first mode based on a specified condition (e.g., biometric information and/or user input). For example, the Bluetooth system 400 may operate in the first mode if a user (e.g., the first user 701) associated with the first device 202-1 is different from a user (e.g., the second user 702) associated with the second device 202-2. The first device 202-1 and the second device 202-2 may obtain biometric information (e.g., hear rate and/or heartbeat timing) about the associated users using a sensor circuit. The first device 202-1 and/or the user device 201 may determine whether the first device 202-1 and the second device 202-2 are associated with the same user based on similarity between the biometric information. For another example, the Bluetooth system 400 may operate in the first mode based on a user input to the first device 202-1 and/or the second device 202-2. If a specified input (e.g., a touch input maintained for a specified time) to an interface (e.g., touch interface) of the first device 202-1 and/or the second device 202-2 is received, the Bluetooth system 400 may operate in the first mode. For another example, the Bluetooth system 400 may operate in the first mode if a specified voice command is received. For another example, the Bluetooth system 400 may operate in the first mode based on biometric information and a user input. In this case, the Bluetooth system 400 may operate in the first mode if the first device 202-1 and the second device 202-2 are worn by different users, and a touch input maintained for at least a specified time is received by the first device 202-1 and the second device 202-2. For another example, the Bluetooth system 400 may operate in the first mode based on a user input to the user device 201. The user device 201 may provide a user interface for controlling an operation mode of the Bluetooth system 400.

According to an embodiment, the Bluetooth system 400 may be set to the first mode based on a specified codec. For example, when the user device 201 and the first device 202-1 establish the first link 205 (e.g., eSCO link) (e.g., operation 505 of FIG. 5), the user device 201 and the first device 202-1 may determine a codec to be used for the first link 205. For example, when entering the first mode, the first device 202-1 and the user device 201 may set a codec associated with the first link 205 to a specified code. For example, the specified codec may be a codec other than a typical codec (e.g., continuously variable slope delta (CVSD) codec or modified subband codec (mSBC)) used for an eSCO link. The specified codec may be set with a specified codec parameter value (e.g., 0xFF). The user device 201 and the first device 202-1 may exchange supported codec information while establishing the first link 205, and may set the codec associated with the first link 205 to the specified codec only when the first device 202-1 and the user device 201 support the specified codec.

If the codec for the first link 205 is set to the specified codec, the user device 201 may stop media data transmission via the first link 205. If the codec for the first link 205 is set to the specified codec, the first device 202-1 may be configured to communicate with the second device 202-2 using the first link 205. The second device 202-2 may obtain codec information about the first link 205 from information associated with the first link 205. If the codec for the first link 205 is set to the specified codec, the second device 202-2 may be configured to communicate with the first device 202-1 using the first link 205. For another example, the second device 202-2 may receive an additional signal instructing operation in the first mode from the user device 201 or the first device 202-1.

According to an embodiment, the Bluetooth system 400 may dynamically change the first mode and the second mode. Once the Bluetooth system 400 operates in the first mode, the Bluetooth system 400 may determine whether to switch to the second mode based on output audio data and/or input audio data. The first device 202-1, for example, may operate in the second mode if audio data corresponding to a voice is not sensed for at least a specified time, and audio data is not received from the second device 202-2 for at least a specified time. The second device 202-2 may operate in the second mode if audio data corresponding to a voice is not sensed for at least a specified time, and audio data is not received from the first device 202-1 for at least a specified time. In this case, the first device 202-1 and/or the second device 202-2 may transmit a signal instructing changing of the operation mode to the user device 201. The user device 201 may transmit audio data via the first link 205 in response to the signal instructing changing of the operation mode. Therefore, the Bluetooth system 400 may operate in the second mode. In the second mode, if audio data corresponding to a voice of a user is sensed, the first device 202-1 or the second device 202-2 may transmit a signal instructing switching to the first mode to the user device 201. The Bluetooth system 400 may operate in the second mode, and the first device 202-1 and the second device 202-2 may exchange audio data corresponding to a user voice.

According to an embodiment, if the Bluetooth system 400 operates in the first mode, the Bluetooth system 400 may determine whether to switch to the second mode based on a user input (e.g., touch input) to the first device 202-1 or the second device 202-2. For example, the first device 202-1 may exchange audio data with the second device 202-2 via the first link 205 while a user input (e.g., touch input) to a button of the first device 202-1 is maintained. In this case, the Bluetooth system 400 may operate in the first mode while a user input to the first device 202-1 or the second device 202-2 is maintained. If the user input to the first device 202-1 is released, the first device 202-1 may transmit a signal indicating release of the user input to the user device 201. If the user input to the second device 202-2 is released, the second device 202-2 may transmit a signal indicating release of the user input to the user device 201. The user device 201 may operate in the second mode if the signal indicating release of the user input is received from both the first device 202-1 and the second device 202-2. In this case, the user device 201 may transmit/receive audio data via the first link 205. In the second mode, if a user input is received, the first device 202-1 may transmit a signal instructing changing of the mode to the second device 202-2 and the user device 201. If a signal corresponding to a user input is received from the first device 202-1, the user device 201 may stop audio data transmission via the first link 205.

In the example of FIG. 7, the second device 202-2 and the first device 202-1 may transmit/receive data using the first link 205. Hereinafter, a data transmitting/receiving method will be described with reference to FIGS. 8 and 9.

Figure 8:
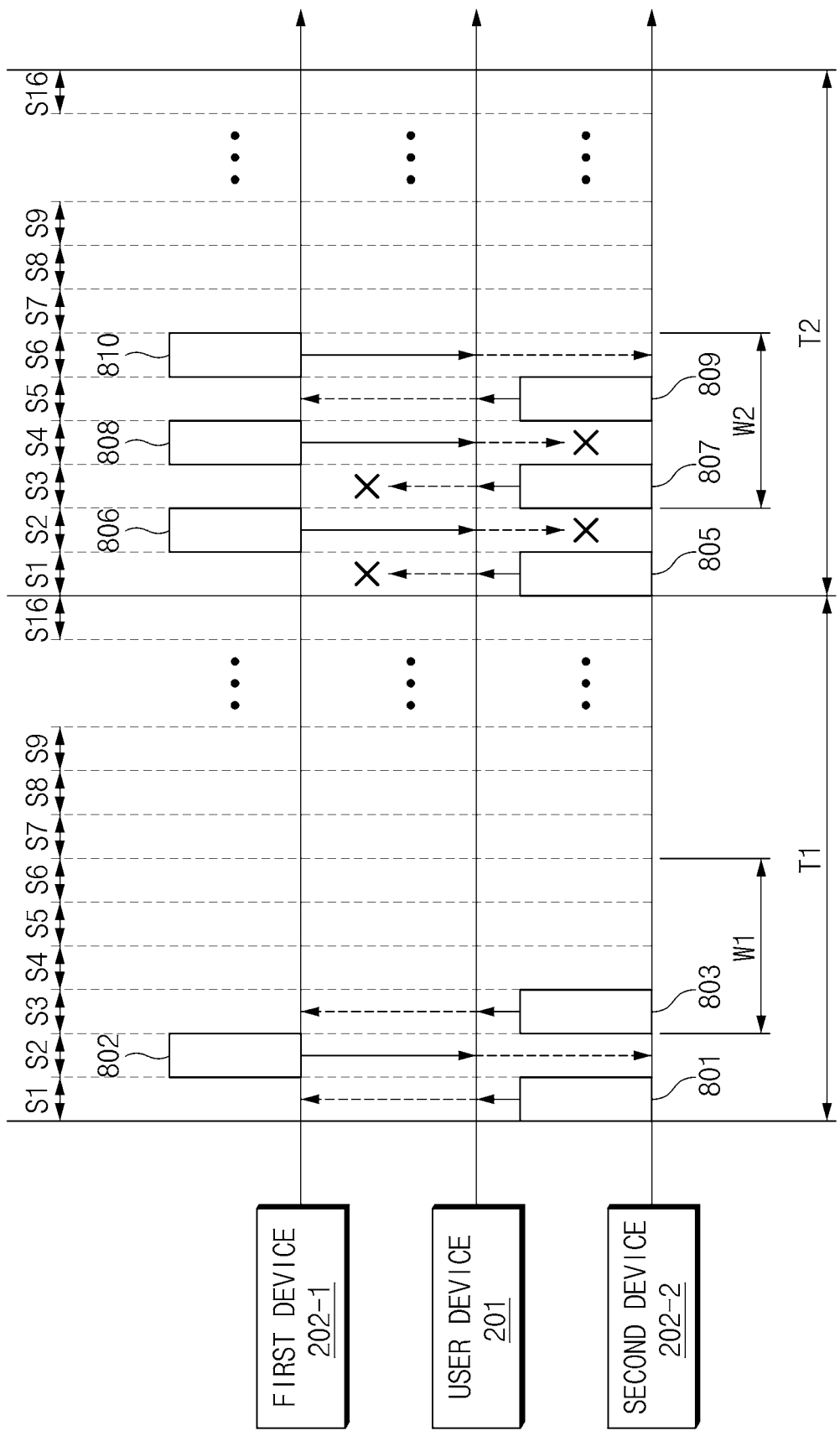
FIG. 8 illustrates an example of data exchange between a first device and a second device according to an embodiment of the disclosure.

FIG. 8 illustrates an example of data exchange between a first device and a second device according to an embodiment of the disclosure.

Referring to FIG. 8, the first link 205 may be an eSCO link, and the first device 202-1, the second device 202-2, and the user device 201 may operate in the first mode. In FIG. 8, periods T1 and T2 (e.g., TeSCO) may include 16 time slots (e.g., S1 to S16). For example, a master device and a slave device may exchange data on a first slot and a second slot of a transmission period, and data retransmission may be performed on four following slots. For example, the data retransmission may be performed in a retransmission windows W1 and W2 (e.g., WeSCO). The slot configuration of FIG. 8 is exemplary, and embodiments of the disclosure are not limited thereto.

According to an embodiment, odd-numbered slots of the first link 205 may be used for transmission of a master device, and even-numbered slots may be used for transmission of a slave device. In the example of FIG. 8, the second device 202-2 may transmit data as a master device of the first link 205, and the first device 202-1 may transmit data as a slave device of the first link 205. If the user device 201 is set to a master device when establishing the first link 205, the second device 202-2 may transmit data as a master device. Therefore, the first device 202-1 may communicate with the second device 202-2 in a way similar to communication with the user device 201.

Referring to FIG. 8, on a first slot S1 of a first period T1, the second device 202-2 may transmit first data 801 to the first device 202-1 via the first link 205. For example, the slot S1 may be a slot allocated for transmission of a master device (e.g., the user device 201) of the first link 205. The second device 202-2 may obtain an audio signal using an audio input circuit of the second device 202-2, and may generate audio data corresponding to the obtained audio signal. The second device 202-2 may transmit the first data 801 including the generated audio data via the first link 205 using the CAC of the first link 205.

On a second slot S2 of the first period T1, the first device 202-1 may transmit second data 802 to the second device 202-2 via the first link 205. For example, the slot S2 may be a slot allocated for transmission of a slave device (e.g., the first device 202-1) of the first link 205. The first device 202-1 may obtain an audio signal using an audio input circuit of the first device 202-1, and may generate audio data corresponding to the obtained audio signal. The first device 202-1 may transmit the second data 802 including the generated audio data via the first link 205. For example, the second data 802 may include ACK information about the first data 801.

On a third slot S3 of the first period T1, the second device 202-2 may transmit third data 803 to the first device 202-1 via the first link 205. For example, the slot S3 may be a slot allocated for transmission of a master device of the first link 205. The third data 803 may include ACK information about the second data 802.

The first device 202-1 and the second device 202-2 may output received data. For example, the first device 202-1 may output the received first data 801 using an audio output circuit of the first device 202-1. The second device 202-2 may output the received second data 802 using an audio output circuit of the second device 202-2.

On a first slot S1 of a second period T2, the second device 202-2 may transmit fifth data 805 to the first device 202-1 via the first link 205. The fifth data 805 may include audio data subsequent to the first data 801. For example, the fifth data 805 may be received by the user device 201, but may not be received by the first device 202-1. For example, since a distance between the first device 202-1 and the second device 202-2 increases or a communication environment changes, the fifth data 805 may fail to be transferred to the first device 202-1.

On a second slot S2 of the second period T2, the first device 202-1 may transmit sixth data 806 to the second device 202-2 via the first link 205. The sixth data 806 may include audio data subsequent to the second data 802 and NACK information. The sixth data 806 may not be received by the second device 202-2. For example, since the distance between the first device 202-1 and the second device 202-2 increases or a communication environment changes, the sixth data 806 may fail to be transferred to the second device 202-2.

On a third slot S3 of the second period T2, the second device 202-2 may transmit seventh data 807 to the first device 202-1 via the first link 205. The seventh data 807 may include audio data included in the fifth data 805 and may include NACK information. The seventh data 807 may not be received by the first device 202-1. For example, the slot S3 of the second period T2 may be a slot allocated to a master device in a second retransmission window W2.

On a fourth slot S4 of the second period T2, the first device 202-1 may transmit eighth data 808 to the second device 202-2 via the first link 205. The eighth data 808 may include audio data included in the sixth data 806 and may include NACK information. The eighth data 808 may not be received by the second device 202-2. For example, the slot S4 of the second period T2 may be a slot allocated to a slave device in the second retransmission window W2.

On a fifth slot S5 of the second period T2, the second device 202-2 may transmit ninth data 809 to the first device 202-1 via the first link 205. The ninth data 809 may include audio data included in the seventh data 807 and may include NACK information. In the example of FIG. 8, the ninth data 809 may be received by the first device 202-1.

On a sixth slot S6 of the second period T2, the first device 202-1 may transmit tenth data 810 to the second device 202-2 via the first link 205. The tenth data 810 may include ACK information about the ninth data 809 and audio data of the eighth data.

In the example of FIG. 8, although transmission/reception of data has been successfully performed within each period, data may not be transmitted/received within a period. For example, the first device 202-1 may fail to receive the ninth data 809, or the second device 202-2 may fail to receive the tenth data 810. If data transmission fails within a retransmission window, the first device 202-1 and the second device 202-2 may stop retransmission of data. In a subsequent period (e.g., T3), the first device 202-1 and the second device 202-2 may transmit/receive audio data subsequent to that of a previous period.

In the example of FIG. 8, the retransmission windows W1 and W2 (e.g., WeSCO) include four slots, but, according to various embodiments, the number of slots included in the retransmission windows W1 and W2 (e.g., WeSCO) may be set based on negotiation between a master device (e.g., the user device 201) and a slave device (e.g., the first device 202-1). For example, in the case where the retransmission windows W1 and W2 (e.g., WeSCO) include six slots, if the second device 202-2 and/or the first device 202-1 fail to receive ACK information about the ninth data 809 and/or the tenth data 810, the second device 202-2 and/or the first device 202-1 may perform retransmission of the ninth data 809 and/or the tenth data 810.

Although data exchange between the first device 202-1 and the second device 202-2 has been described with reference to FIG. 8, embodiments of the disclosure are not limited thereto. According to an embodiment, the user device 201 may also transmit audio data via the first link 205, and the first device 202-1 and the second device 202-2 may receive audio data via the first link 205. For example, the user device 201 may transmit audio data via the first link 205 on a specified slot in a period. For example, the specified slot may be a slot that is not used for data exchange between the first device 202-1 and the second device 202-2. As described above, the first device 202-1, the second device 202-2, and the user device 201 may use a radio resource of the first link in a specified order. In this case, a three-party conversation may be possible between the first device 202-1, the second device 202-2, and the user device 201. Although data retransmission between the first device 202-1 and the second device 202-2 has been described with reference to FIG. 8, embodiments of the disclosure are not limited thereto. According to an embodiment, the user device 201 may perform retransmission of audio data between the user device 201 and the first device 202-1 or the second device 202-2 via the first link 205. According to an embodiment, the user device 201 may monitor the first link 205, and may identify whether the second device 202-2 transmits a response signal and/or audio data in response to audio data transmitted from the first device 202-1. For example, if data transmission from the first device 202-1 to the second device 202-2 via the first link 205 fails at least a specified number of times, or fails during a specified time (e.g., time including the first period T1 and the second period T2), the user device 201, instead of the first device 202-1, may retransmit data of the first device 202-1 via the first link 205. In the case where the user device 201 retransmits data, the first device 202-1 may be configured to stop data retransmission. Likewise, the user device 201, instead of the second device 202-2, may retransmit data that is transmitted from the second device 202-2 to the first device 202-1.

Figure 9:
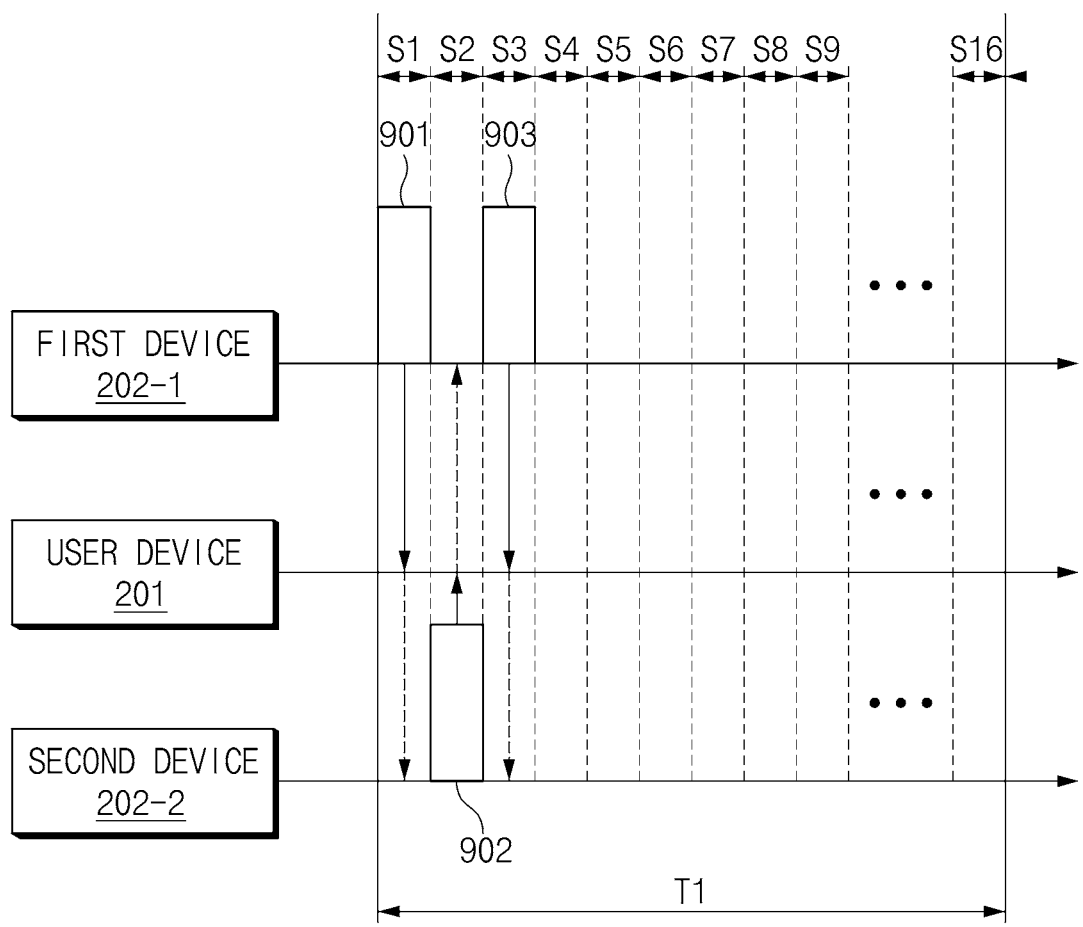
FIG. 9 illustrates another example of data exchange between a first device and a second device according to an embodiment of the disclosure.

FIG. 9 illustrates another example of data exchange between a first device and a second device according to an embodiment of the disclosure.

In the example of FIG. 8, the first device 202-1 operates as a slave device of the first link 205, but embodiments of the disclosure are not limited thereto. Referring to FIG. 9, the first device 202-1 may operate as a master device of the first link 205.

On a first slot S1 of a first period T1, the first device 202-1 may transmit first data 901 to the second device 202-2 via the first link 205. For example, the slot S1 may be a slot allocated for transmission of a master device (e.g., the user device 201) of the first link 205. The first device 202-1 may obtain an audio signal using an audio input circuit of the first device 202-1, and may generate audio data corresponding to the obtained audio signal. The first device 202-1 may transmit the first data 901 including the generated audio data via the first link 205 using the CAC of the first link 205.

On a second slot S2 of the first period T1, the second device 202-2 may transmit second data 902 to the first device 202-1 via the first link 205. For example, the slot S2 may be a slot allocated for transmission of a slave device (e.g., the first device 202-1) of the first link 205. The second device 202-2 may obtain an audio signal using an audio input circuit of the second device 202-2, and may generate audio data corresponding to the obtained audio signal. The second device 202-2 may transmit the second data 902 including the generated audio data via the first link 205. For example, the second data 902 may include ACK information about the first data 901.

On a third slot S3 of the first period T1, the first device 202-1 may transmit third data 903 to the second device 202-2 via the first link 205. For example, the slot S3 may be a slot allocated for transmission of a master device of the first link 205. The third data 903 may include ACK information about the second data 902.

The first device 202-1 and the second device 202-2 may output received data. For example, the first device 202-1 may output the second data 902 using an audio output circuit. The second device 202-2 may output the first data 901 using an audio output circuit.

According to an embodiment, when the first device 202-1 and the second device 202-2 operate in the first mode with regard to the first link 205, the first device 202-1 and the second device 202-2 may operate based on a role of a master device or slave device of the third link 215. For example, when the first device 202-1 serves as a master device of the third link 215, the first device 202-1 may transmit data on a slot allocated for transmission of a master device of the first link 205 when operating in the first mode with regard to the first link 205.

According to an embodiment, when operating in the first mode with regard to the first link 205, the first device 202-1 and the second device 202-2 may determine a role of a master device or slave device based on a signal strength related to the first link 205. For example, if the signal strength of data received by the first device 202-1 from the user device 201 via the first link 205 is higher than the signal strength of data received by the second device 202-2 from the user device 201 via the first link 205, the first device 202-1 may operate as a master device.

The first device 202-1 and the second device 202-2 have been described as communicating based on an eSCO link with reference to FIGS. 8 and 9, but embodiments of the disclosure are not limited thereto. For example, the first link 205 may be an ACL protocol-based link, and the first device 202-1 and the second device 202-2 may communicate based on an asynchronous protocol. In this case, the first device 202-1 and the second device 202-2 may be configured to transmit/receive data at a specified period. If data transmission fails within one period, the first device 202-1 and the second device 202-2, in a subsequent period, may transmit/receive subsequent data rather than the data that has failed to be transmitted.

The first device 202-1 and the second device 202-2 have been described as exchanging audio data with reference to FIGS. 8 and 9, but embodiments of the disclosure are not limited thereto. For example, the first device 202-1 and the second device 202-2 may be configured to unidirectionally transmit audio data within one period. Referring to FIG. 9, in the first period T1, the first device 202-1 may transmit audio data to the second device 202-2. For example, the first data 901 may include audio data obtained by the first device 202-1. The second data 902 may include ACK information about the first data 901. The second data 902 may not include audio data. In the example, the third data 903 may be omitted. Referring to FIG. 9, in the first period T1, the second device 202-2 may transmit audio data to the first device 202-1. For example, the first data 901 may include a polling command. The first data 901 may not include audio data. The second data 902 may include ACK information about the first data 901 and audio data obtained by the second device 202-2. For example, the third data 903 may include ACK information about the second data 902.

Figure 10:
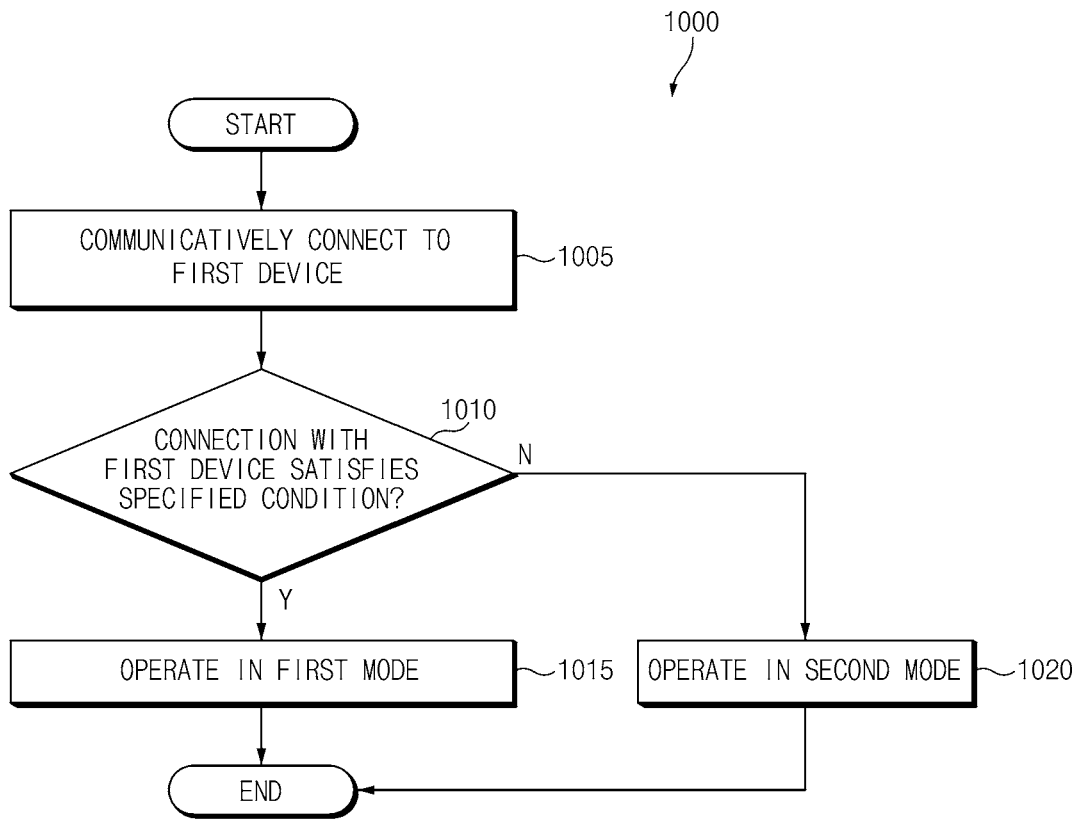
FIG. 10 is a flowchart illustrating an operation method of a user device according to an embodiment of the disclosure.

FIG. 10 is a flowchart illustrating a method for operating the user device 201 according to an embodiment of the disclosure.

Referring to FIG. 10, in a method 1000, in operation 1005, the user device 201 may communicatively connect to the first device 202-1 (e.g., operation 505 of FIG. 5). For example, the user device 201 may create a communication link (e.g., the first link 205) with the first device 202-1.

In operation 1010, the user device 201 may determine whether a connection with the first device 202-1 satisfies a specified condition. For example, the user device 201 may determine that the specified condition is satisfied if a codec set for connecting the first device 202-1 is a specified codec.

If the specified condition is satisfied (operation 1010— YES), the user device 201 may operate in the first mode in operation 1015. In the first mode, the user device 201 may be configured not to transmit at least a portion of data using the connection with the first device 202-1. For example, the user device 201 may receive data from the first device 202-1 and the second device 202-2 via the connection with the first device 202-1. The user device 201 may generate and store an audio recording using received data. The user device 201 may generate and store a text record for audio data by performing voice recognition using the received data. For another example, the user device 201 may be configured to only control the connection with the first device 202-1 without receiving data while operating in the first mode.

In an embodiment, when the first device 202-1 and the second device 202-2 perform communication using the connection (e.g., the first link 205) between the user device 201 and the first device 202-1, the user device 201 may manage the first link 205. Since the user device 201 operates the first link 205, the user device 201 may control interrupt of communication between the first device 202-1 and the second device 202-2. The user device 201 may restrict output of a notification (e.g., a call notification or message notification) or media in the first mode. For example, even if a notification occurs in the first mode, the user device 201 may not transmit data corresponding to the notification to the first device 202-1 and the second device 202-2. For another example, the user device 201 may perform media output in the user device 201 even if media is played back in the first mode. For another example, through the interrupt control in the first mode, the user device 201 may reduce the interrupt of communication between the first device 202-1 and the second device 202-2.

According to an embodiment, in the first mode, the user device 201 may end (e.g., terminate) the first mode based on a user input or setting when a notification occurs. For example, the user device 201 may provide a notification to a display when the notification occurs, and may end the first mode if a specified input (e.g., call reception input) for the notification is received. For another example, the user device 201 may end the first mode in response to the notification according to a setting. The user device 201 may interrupt communication between the first device 202-1 and the second device 202-2 by transferring information instructing termination of the first mode to the first device 202-1 and/or the second device 202-2. When the first mode is ended, the user device 201, the first device 202-1, and the second device 202-2 may operate in the second mode.

According to an embodiment, in the first mode, the user device 201 may end the first mode based on a link connection state. For example, when the first link 205 is released, the user device 201 may end the first mode. In this case, if the user device 201 and the first device 202-1 are connected again, the user device 201 may configure the first device 202-1 and the second device 202-2 to operate in the first mode. For another example, when the second link 210 is released, the user device 201 may end the first mode. For another example, the user device 201 may end the first mode when the third link 215 between the first device 202-1 and the second device 202-2 is released. In this case, the user device 201 may receive a signal indicating a release of the second link 210 from the first device 202-1 or the second device 202-2.

According to an embodiment, the first device 202-1 or the second device 202-2 may end the first mode. For example, when the second device 202-2 is disconnected (e.g., when a signal is not received for at least a specified time from the second device 202-2 via the first link 205), the first device 202-1 may transmit a signal for requesting termination of the first mode to the user device 201. For another example, when the third link 215 is disconnected, the first device 202-1 or the second device 202-2 may transmit a signal for requesting termination of the first mode to the user device 201.

According to an embodiment, if a condition for termination the first mode is satisfied, the first device 202-1 or the second device 202-2 may switch the first link 205 from the first mode to the second mode by requesting the user device 201 to change a codec of the first link 205 from a specified codec to a typical codec (e.g., continuously variable slope delta (CVSD) codec or modified subband codec (mSBC)). According to another embodiment, if a condition for termination the first mode is satisfied, the user device 201 may switch the first link 205 from the first mode to the second mode by requesting the first device 202-1 to change a codec of the first link 205 from a specified codec to a typical codec (e.g., continuously variable slope delta (CVSD) codec or modified subband codec (mSBC)).

If the specified condition is not satisfied (operation 1010—NO), the user device 201 may operate in the second mode in operation 1020. For example, if a specified codec is not set for a communication connection between the user device 201 and the first device 202-1, the user device 201 may operate in the second mode. In the second mode, the user device 201 may transmit/receive data to/from the first device 202-1. The second device 202-2 may listen (e.g., receive) communication between the first device 202-1 and the user device 201 by monitoring a connection between the user device 201 and the first device 202-1.

In relation to FIG. 10, a connection with the first device has been described as the specified condition, but embodiments of the disclosure are not limited thereto. For example, the user device 201, the first device 202-1, and the second device 202-2 may operate in the first mode if a user associated with the first device 202-1 is different from a user associated with the second device 202-2. For example, the user device 201, the first device 202-1, and the second device 202-2 may operate in the first mode based on a user input to the first device 202-1 and/or the second device 202-2. For example, the user device 201, the first device 202-1, and the second device 202-2 may operate in the first mode if a specified voice command is received. For example, the user device 201, the first device 202-1, and the second device 202-2 may operate in the first mode based on biometric information or a user input. In this case, the Bluetooth system 400 may operate in the first mode if the first device 202-1 and the second device 202-2 are worn by different users, and a touch input maintained for at least a specified time is received by the first device 202-1 and the second device 202-2. For example, the user device 201, the first device 202-1, and the second device 202-2 may operate in the first mode based on a user input to the user device 201.

Figure 11:
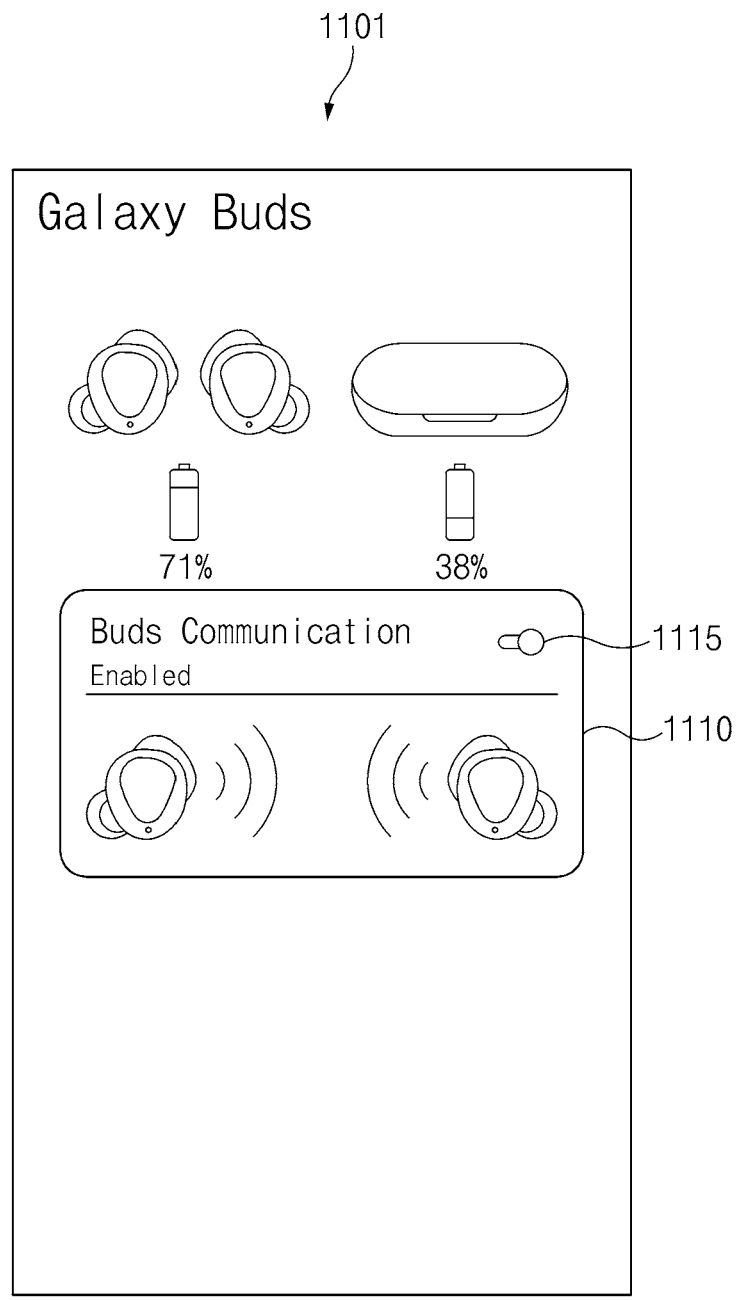
FIG. 11 illustrates a user interface for connecting communication between devices according to an embodiment of the disclosure.

FIG. 11 illustrates a user interface for connecting communication between devices according to an embodiment of the disclosure.

Referring to FIG. 11, the user device 201 may provide a user interface 1101 for controlling settings of the first device 202-1 and the second device 202-2. The user interface 1101 may include a user interface 1110 for setting communication between the first device 202-1 and the second device 202-2. The user device 201 may enable or disable the first mode based on an input to a button 1115 of the user interface 1110.

The form of the user interface 1101 illustrated in FIG. 11 is exemplary, and embodiments of the disclosure are not limited thereto. For example, the user interface 1101 may separately display battery information about each of the first device 202-1 and the second device 202-2. According to an embodiment, the user interface 1101 may further include a graphic object not illustrated in FIG. 11. For example, the user interface 1101 may further include a graphic object for controlling operation of the user device 201 during communication of the first device 202-1 and the second device 202-2. The user device 201 may be configured to record communication between the first device 202-1 and the second device 202-2, recognize, in real time, a conversation (e.g., speech-to-text recognition) between the first device 202-1 and the second device 202-2, or generate a transcript of a conversation between the first device 202-1 and the second device 202-2, based on a user input to the graphic object. The above-mentioned operations of the user device 201 are exemplary, and the user device 201 may be configured to perform various functions during communication between the first device 201-1 and the second device 202-2 based on a user input to the graphic object.

Although not illustrated, the user interface 1101 may provide information about a communication state between the first device 202-1 and the second device 202-2. For example, the first device 202-1 or the second device 202-2 may transmit state information (e.g., received signal strength indication (RSSI)) about a communication connection via the first link 205. When the state information about a communication connection does not satisfy a specified condition (e.g., when signal strength is low), the user device 201 may provide information indicating that the first mode will be disabled or information indicating that the communication state between the first device 202-1 and the second device 202-2 is not good.

Figure 12:
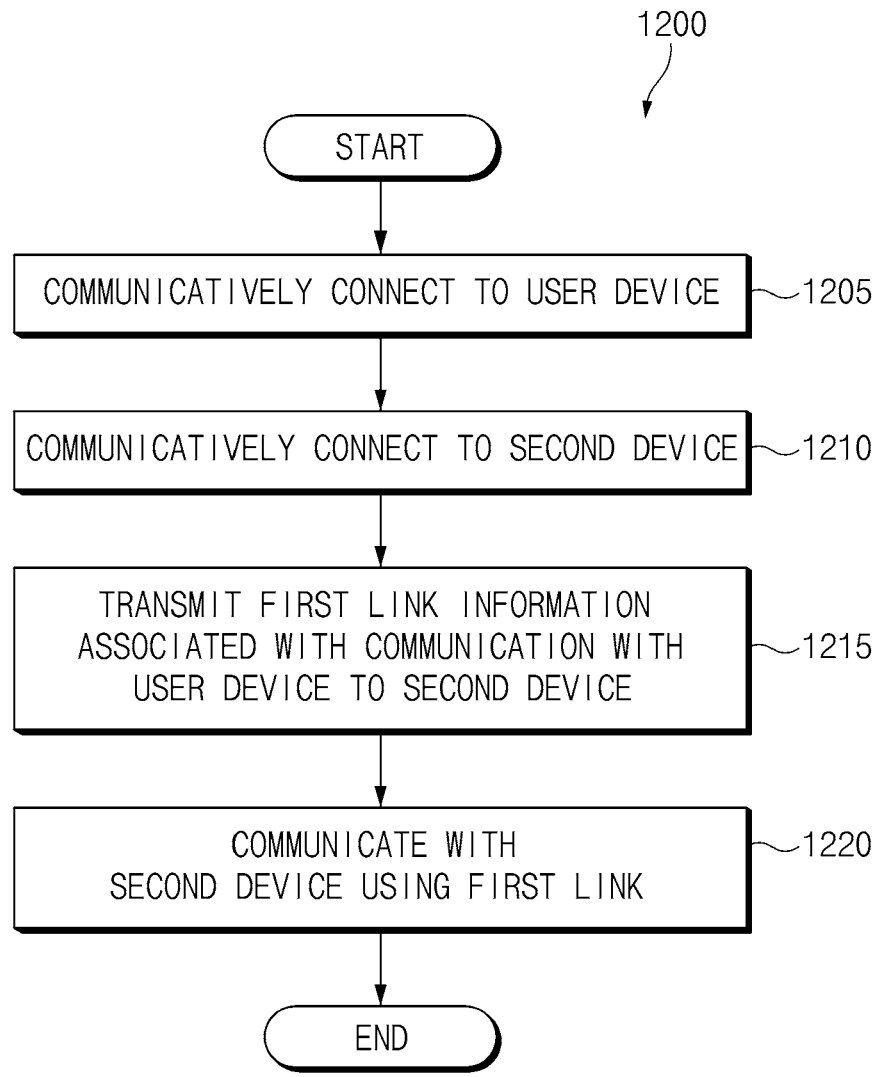
FIG. 12 is a flowchart illustrating a communication method of a first device according to an embodiment of the disclosure.

FIG. 12 is a flowchart illustrating a communication method of the first device according to an embodiment of the disclosure.

Referring to FIG. 12, in a method 1200, in operation 1205, the first device 202-1 may communicatively connect to the user device 201 (e.g., the first link establishment in operation 505 of FIG. 5). In operation 1210, the first device 202-1 may communicatively connect to the second device 202-2 (e.g., the third link establishment in operation 515 of FIG. 5). In operation 1215, the first device 202-1 may transmit, to the second device 202-2, information about the first link 205 associated with communication with the user device 201. For example, the information about the first link 205 may include address information (e.g., the Bluetooth address of the master device of the first link 205, the Bluetooth address of the user device 201, and/or the Bluetooth address of the first device 202-1), piconet (e.g., topology 200) clock information (e.g., clock native (CLKN) of the master device of the first link 205), logical transport (LT) address information (e.g., information allocated by the master device of the first link 205), used channel map information, link key information, service discovery protocol (SDP) information (e.g., service and/or profile information associated with the first link 205), and/or supported feature information. The information associated with the first link 205 may further include, for example, an extended inquiry response (EIR) packet. The EIR packet may include resource control information about the first link 205 and/or information about a manufacturer. In operation 1220, the first device 202-1 may communicate with the second device 202-2 using the first link 205. For example, the first device 202-1 may communicate with the second device 202-2 according to the method described above with reference to FIGS. 7 to 11. For example, the first device 202-1 may communicate with the second device 202-2 via the first link 205 while the first mode is maintained. According to an embodiment, the first device 202-1 may perform operation 1220 when switched to the first mode. For example, the first device 202-1 may sense a first mode operation based on a user input, biometric information, and/or codec information. According to an embodiment, the first device 202-1 may perform operation 1220 based on reception of a request for changing to the first mode from the user device 201. For example, the user device 201 may receive, from a user, an input for requesting communication between the first device 202-1 and the second device 202-2, and may transmit a signal for requesting changing to the first mode to the first device 202-1 based on the received input.

A method for communication of the first device 202-1 according to an embodiment may include connecting the user device 201 with the first link 205 based on a Bluetooth protocol (e.g., operation 1205), connecting the second device 202-2 with the third link 215 based on the Bluetooth protocol (e.g., operation 1210), transmitting connection information (e.g., first link information) including information about the first link 205 to the second device 202-2 (e.g., operation 1215), and communicating with the second device 202-2 (e.g., operation 1220). The communicating with the second device 202-2 may include receiving first data from the second device 202-2 via the first link 205 on a first slot of the first link 205 and transmitting second data to the second device 202-2 via the first link 205 on a second slot of the first link 205. For example, the first link 205 may be an enhanced synchronous connection oriented (eSCO) link.

The method for communication of the first device 202-1 may further include obtaining the second data using an audio reception circuit and outputting the first data using an audio output circuit. For example, the connection information may include at least one of a channel access code of the first link or a Bluetooth address of the user device.

The method for communication of the first device 202-1 may further include receiving, from the user device 201, a termination signal indicating termination of communication with the second device 202-2, and communicating with the user device 201 using the first link 205 in response to reception of the termination signal.

Figure 13:
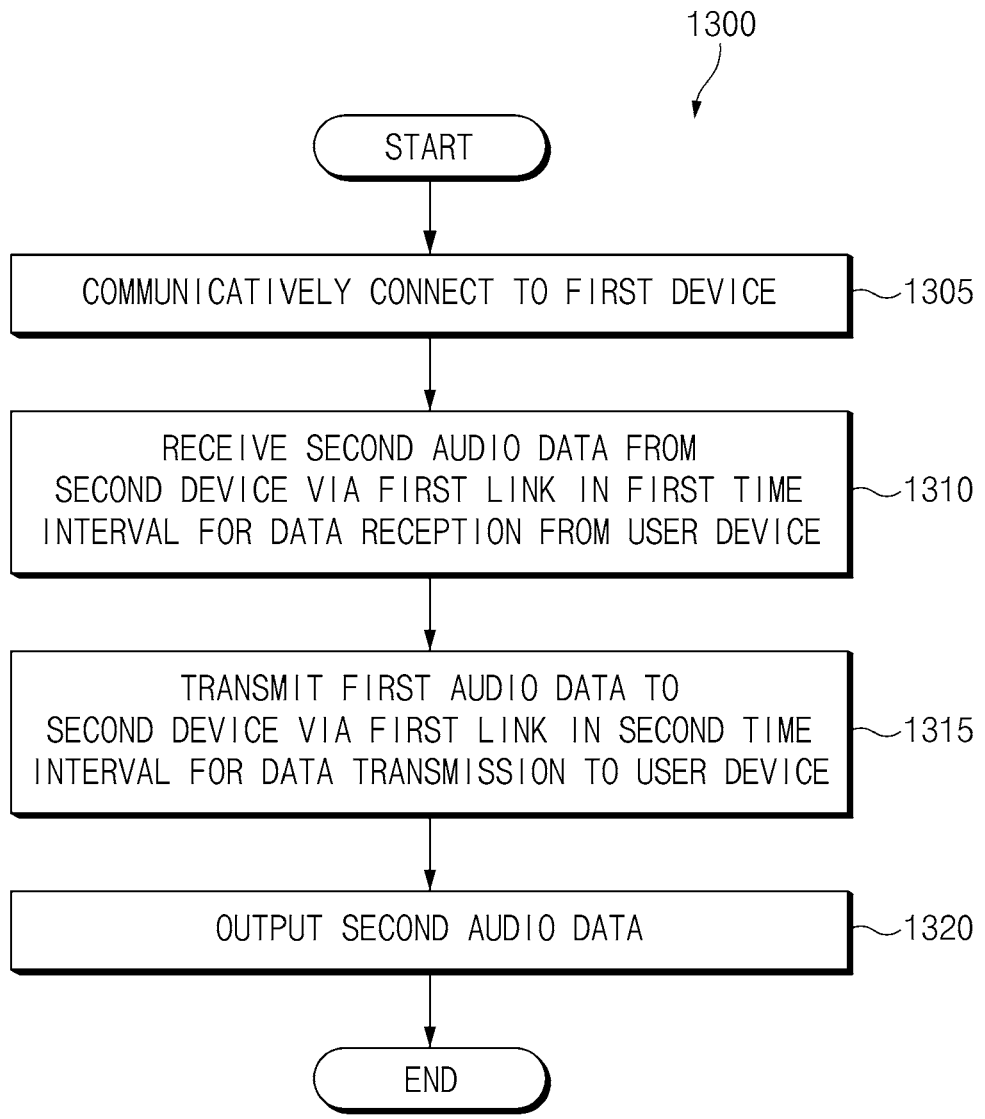
FIG. 13 is a flowchart illustrating a method for a first device to communicate with a second device according to an embodiment of the disclosure.

FIG. 13 illustrates a flowchart illustrating a method for the first device to communicate with the second device according to an embodiment of the disclosure. For example, the communication method of FIG. 13 may correspond to operation 1220 of FIG. 12.

Referring to FIG. 13, in a method 1300, in operation 1305, the first device 202-1 may obtain first audio data. For example, the first device 202-1 may obtain an audio signal using an audio reception circuit of the first device 202-1. The first device 202-1 may obtain the first audio data by processing the audio signal. For example, the first device 202-1 may obtain the first audio data by performing analog-to-digital conversion (ADC), filtering, noise reduction, and/or encoding on the audio signal.

In operation 1310, the first device 202-1 may receive second audio data from the second device 202-2 via the first link 205 in a first time interval (e.g., the first slot S1 of the first period T1 of FIG. 8) for receiving data from the user device 201. For example, the second audio data may include audio data obtained by the second device 202-2.

In operation 1315, the first device 202-1 may transmit the first audio data to the second device 202-2 via the first link 205 in a second time interval (e.g., the second slot S2 of the first period T1 of FIG. 8) for transmitting data to the user device 201.

In operation 1320, the first device 202-1 may output the second audio data. For example, the first device 202-1 may output the second audio data using an audio output circuit.

According to an embodiment, the time interval in which the first device 202-1 transmits the first audio data to the second device 202-2 and the time interval in which the first device 202-1 receives the second audio data from the second device 202-2 may be changed. For example, the first device 202-1 may transmit the first audio data via the first link 205 in the first time interval (e.g., the first slot S1 of the first period T1 of FIG. 8), and may receive the second audio data from the second device 202-2 via the first link 205 in the second time interval (e.g., the second slot S2 of the first period T1 of FIG. 8).

Figure 14:
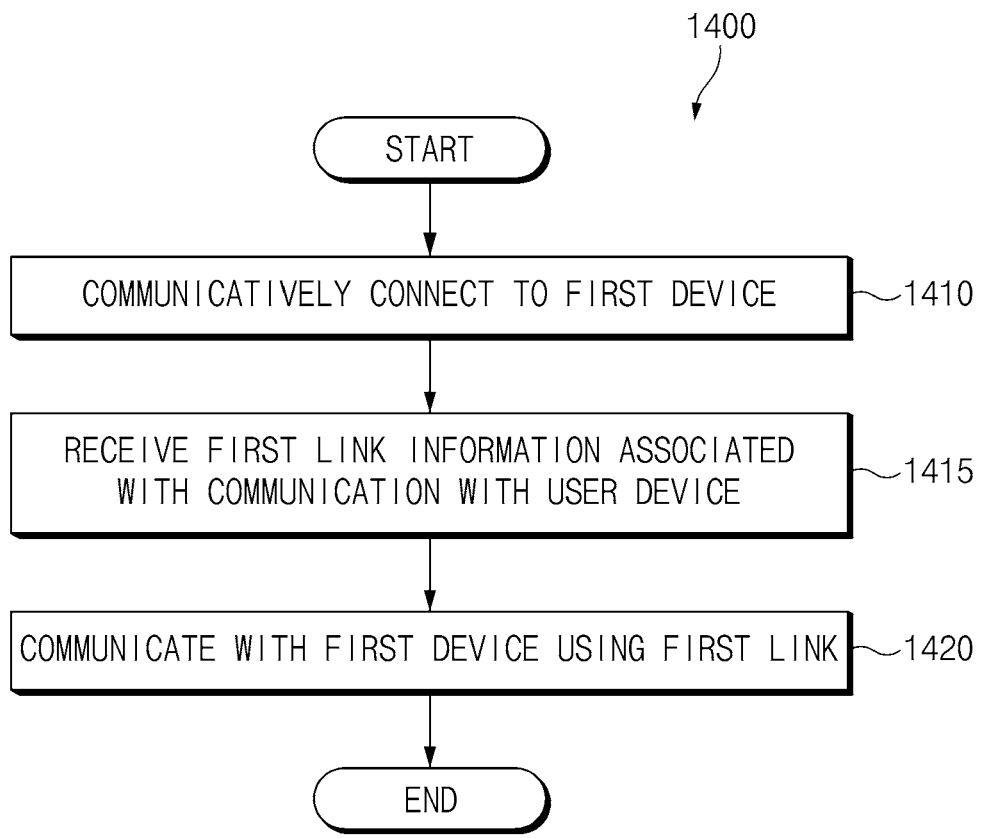
FIG. 14 is a flowchart illustrating a communication method of a second device according to an embodiment of the disclosure.

FIG. 14 is a flowchart illustrating a communication method of the second device 202-2 according to an embodiment of the disclosure.

Referring to FIG. 14, in operation 1410, the second device 202-2 may communicatively connect to the first device 202-1 (e.g., the third link establishment in operation 515 of FIG. 5). In operation 1415, the second device 202-2 may receive information about the first link 205 associated with communication with the user device 201. For example, the second device 202-2 may listen (e.g., receive) communication transmitted/received via the first link 205 between the first device 202-1 and the user device 201 based on the information about the first link 205. In operation 1420, the second device 202-2 may communicate with the first device 202-1 using the first link 205. For example, the second device 202-2 may communicate with the first device 202-1 according to the method described above with reference to FIGS. 7 to 11. According to an embodiment, the second device 202-2 may perform operation 1420 when it is confirmed that the first link 205 is operated in the first mode. For example, the second device 202-2 may perform operation 1420 when it is detected that the first device 202-1 or the user device 201 changes to use a specified codec for the first link 205.

The embodiments in which the first device 202-1 and the second device 202-2 communicate using the first link 205 have been described with reference to FIGS. 7 to 14. However, embodiments of the disclosure are not limited thereto. As described below with reference to FIGS. 15 to 17, the first device 202-1 and the second device 202-2 may communicate using various links. In the following descriptions, the above-mentioned embodiments may be combined with the embodiments described below unless otherwise stated. For example, the above descriptions provided above with reference to FIGS. 10 and 11 may be likewise applied to the embodiments described below.

Figure 15:
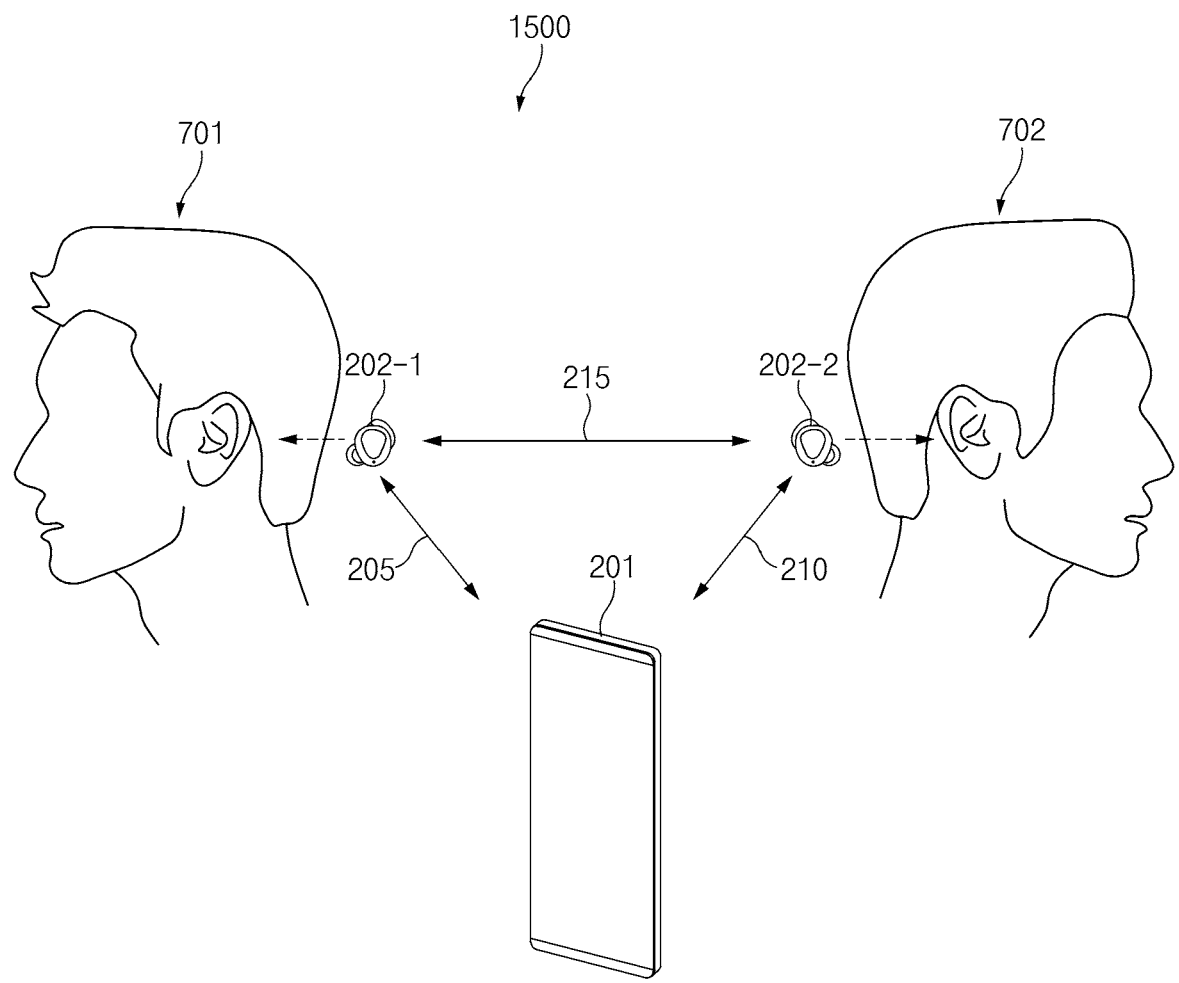
FIG. 15 illustrates a communication environment of a first device and a second device according to an embodiment of the disclosure.

FIG. 15 illustrates a communication environment of a first device and a second device according to an embodiment of the disclosure. The communication environment 1500 of FIG. 15 is similar to the communication environment 700 of FIG. 7. The descriptions related to FIG. 7 may be referenced for the same reference numerals.

Figure 16:
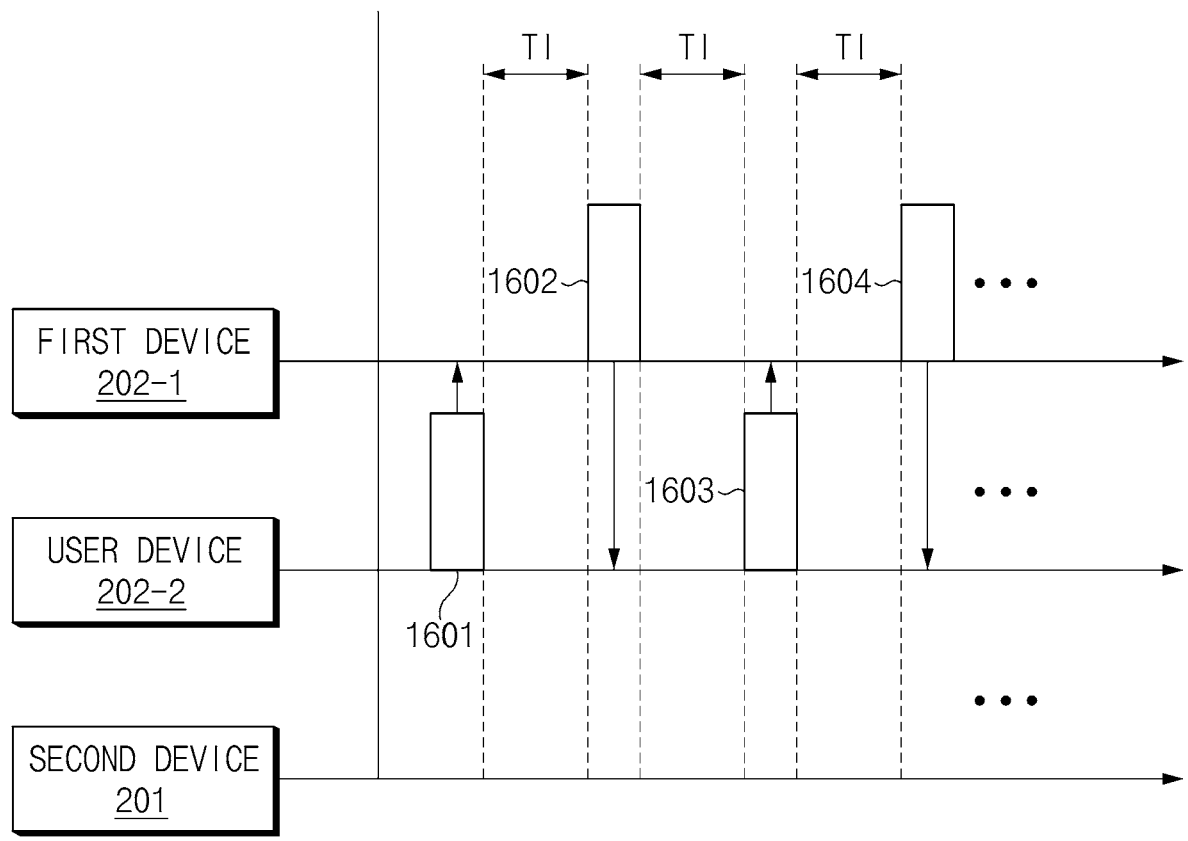
FIG. 16 illustrates data exchange between a first device and a second device using a third link according to an embodiment of the disclosure.

FIG. 16 illustrates data exchange between the first device and the second device using a third link according to an embodiment of the disclosure.

Referring to FIGS. 15 and 16, in a communication environment 1500, the first device 202-1 and the second device 202-2 may communicate via the third link 215. For example, in the first mode, the first device 202-1 and the second device 202-2 may be configured to communicate via the third link 215, and the user device 201 may be configured not to transmit media data via the first link 205 (unless there are exceptional situations). For example, the user device 201 may be configured to transmit only minimal packets required for maintaining the first link 205 and/or the second link 210. According to an embodiment, the first device 202-1 or the second device 202-2 may configure the user device 201 so as not to transmit media data via the first link 205 by setting a specified codec for a communication connection (e.g., the first link 205 or the second link 210) with the user device 201.

The second device 202-2 may transmit first data 1601 (e.g., data including audio data obtained by the second device 202-2) to the first device 202-1 via the third link 215. After a specified time TI after receiving the first data 1601, the first device 202-1 may transmit second data 1602 (e.g., data including audio data obtained by the first device 202-1) to the second device 202-2 via the third link 215. After elapse of the specified time TI after receiving the second data 1602, the second device 202-2 may transmit third data 1603 to the first device 202-1 via the third link 215. Likewise, after elapse of the specified time TI after receiving the third data 1603, the first device 202-1 may transmit fourth data 1604 to the second device 202-2 via the third link 215. For example, real-time data exchange between the first device 202-1 and the second device 202-2 may be enabled by setting a device-to-device transmission interval (e.g., inter frame space) of the third link 215 short.

Referring to FIG. 16, communication via the third link 215 is performed based on a BLE standard, but embodiments of the disclosure are not limited thereto. For example, the first device 202-1 and the second device 202-2 may be configured to communicate based on a slot in a manner similar to the manners illustrated in FIGS. 8 and 9.

According to an embodiment, the first device 202-1 or the second device 202-2 may transmit information associated with the third link 215 to the user device 201. The user device 201 may be configured to receive or listen data from the first device 202-1 and the second device 202-2 via the third link 215 based on the information associated with the third link 215. The user device 201 may generate a text record that is based on an audio recording or audio data by using the received or listened data.

Figure 17:
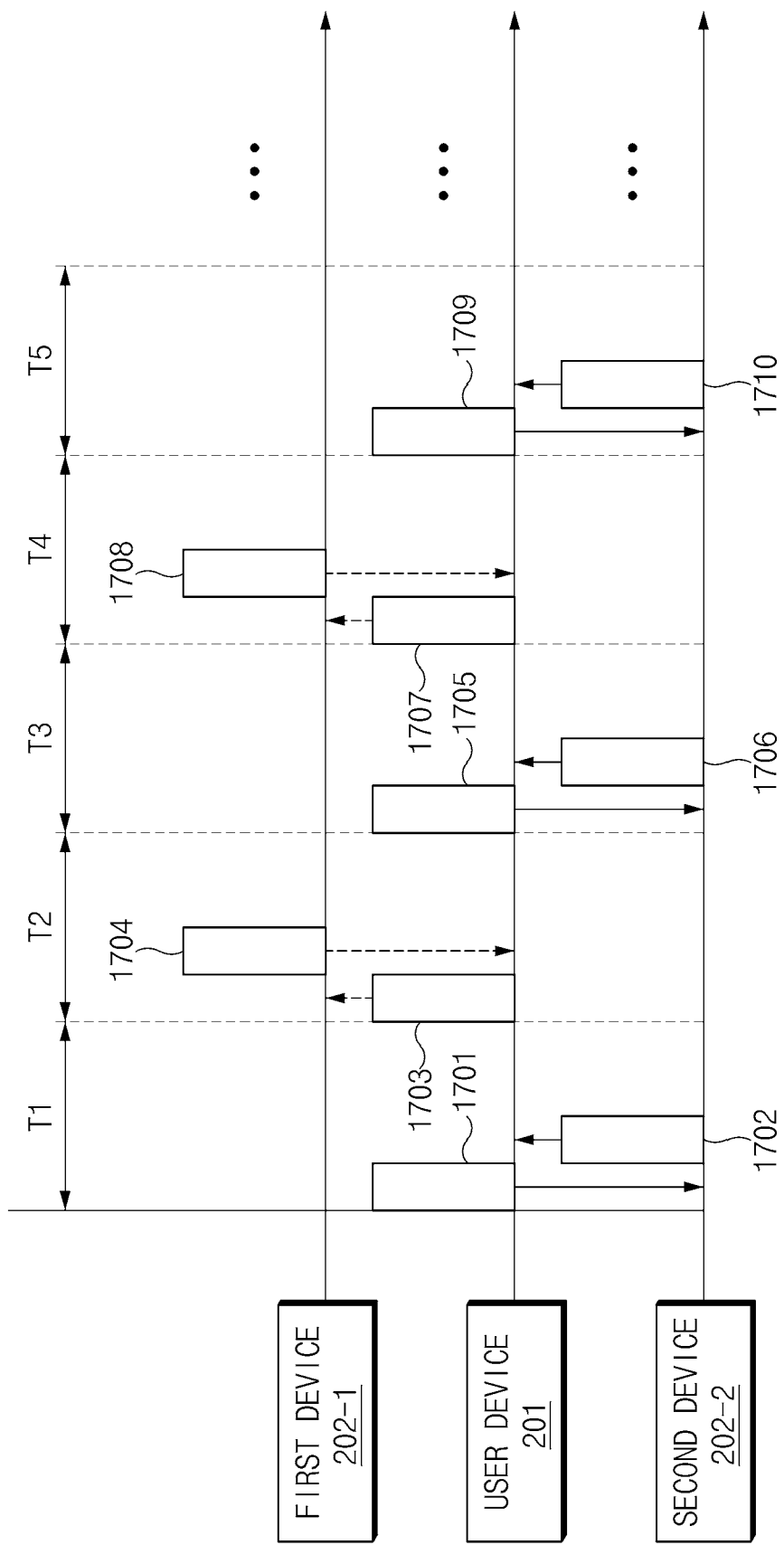
FIG. 17 illustrates data exchange between a first device and a second device via a user device according to an embodiment of the disclosure.

FIG. 17 illustrates data exchange between the first device 202-1 and the second device 202-2 via the user device 201 according to an embodiment of the disclosure. Referring to FIGS. 15 and 17, the first device 202-1 and the second device 202-2 may communicate via the user device 201. For example, the first link 205 and the second link 210 may be a connection based on eSCO, A2DP, or SPP.

Referring to FIG. 17, the user device 201 may relay communication between the first device 202-1 and the second device 202-2. For example, the user device 201 may use the first link 205 in communication with the first device 202-1. The user device 201 may use the second link 210 in communication with the second device 202-2. The user device 201 may receive data from the first device 202-1 via the first link 205, and may transfer the received data to the second device 202-2 via the second link 210. The user device 201 may receive data from the second device 202-2 via the second link 210, and may transfer the received data to the first device 202-1 via the first link 205.

In a first period T1, the user device 201 may transmit first data 1701 to the second device 202-2 via the second link 210 as the user device 201 enters the first mode. For example, the first data 1701 may include a polling packet. In response to reception of the polling packet, the second device 202-2 may transmit second data 1702 to the user device 201 via the second link 210. For example, the second data 1702 may include audio data obtained by the second device 202-2.

In a second period T2, the user device 201 may transmit third data 1703 to the first device 202-1 via the first link 205. For example, the third data 1703 may include audio data of the second data 1702. In response to reception of the third data 1703, the first device 202-1 may transmit fourth data 1704 to the user device 201 through the first link 205. For example, the fourth data 1704 may include ACK information about the third data 1703 and/or audio data obtained by the first device 202-1.

In a third period T3, the user device 201 may transmit fifth data 1705 to the second device 202-2 via the second link 210. For example, the fifth data 1705 may include audio data of the fourth data 1704. The second device 2022 may transmit sixth data 1706 to the user device 201 via the second link 210. For example, the sixth data 1706 may include ACK information about the fifth data 1705 and/or audio data that is subsequent in time to the second data 1702.

In a fourth period T4, the user device 201 may transmit seventh data 1707 to the first device 202-1 via the first link 205. For example, the seventh data 1707 may include ACK information about the fourth data 1704 and/or audio data of the sixth data 1706. The first device 202-1 may transmit eighth data 1708 to the user device 201 via the first link 205. For example, the eighth data 1708 may include ACK information about the seventh data 1707 and/or audio data that is subsequent in time to the fourth data 1704.

In a fifth period T5, the user device 201 may transmit ninth data 1709 to the second device 202-2 via the second link 210. For example, the ninth data 1709 may include ACK information about the sixth data 1706 and/or audio data of the eighth data 1708. The second device 202-2 may transmit tenth data 1710 to the user device 201 via the second link 210. For example, the tenth data 1710 may include ACK information about the ninth data 1709 and/or audio data that is subsequent in time to the sixth data 1706.

The user device 201 has been described as relaying data between the first device 202-1 and the second device 202-2 with reference to FIG. 17, but operation of the user device 201 is not limited thereto. According to an embodiment, the user device 201 may perform sound quality enhancement and/or error correction on received data before relaying the received data. For example, the user device 201 may perform sound quality enhancement on the audio data of the received second data 1702, and may transfer the third data 1703 including enhanced audio data to the first device 202-1. Likewise, the user device 201 may perform sound quality enhancement on the audio data of the received fourth data 1704, and may transfer the fifth data 1705 including enhanced audio data to the second device 202-2. For example, the user device 201 may perform error correction on the received second data 1702. For example, if the second data 1702 includes information (e.g., forward error correction packet) for error correction, the user device 201 may perform error correction on the second data 1702 using the information for error correction, and may transfer the third data 1703 including error-corrected data to the first device 202-1. Likewise, the user device 201 may perform error correction on the received fourth data 1704, and may transfer the fifth data 1705 including error-corrected data to the second device 202-2. According to an embodiment, the user device 201 may generate and transmit information for sound quality enhancement and/or error correction for received data. For example, the user device 201 may generate information for sound quality enhancement and/or error correction based on the audio data of the second data 1702, and may transfer, to the first device 202-1, the third data 1703 including the generated information for sound quality enhancement and/or error correction. For another example, the user device 201 may generate information for sound quality enhancement and/or error correction based on the audio data of the received fourth data 1704, and may transfer, to the second device 202-2, the fifth data 1705 including the generated information for sound quality enhancement and/or error correction.

Communication (e.g., first mode) between the first device 202-1 and the second device 202-2 via the first link 205 has been described with reference to FIGS. 7 to 9. For example, communication between the first device 202-1 and the second device 202-2 via the first link 205 may be referred to as a first communication mode. Communication between the first device 202-1 and the second device 202-2 via the third link 215 has been described with reference to FIG. 16. Communication between the first device 202-1 and the second device 202-2 via the third link 215 may be referred to as a second communication mode. Communication between the first device 202-1 and the second device 202-2 via the user device 201 has been described with reference to FIG. 17. Communication between the first device 202-1 and the second device 202-2 via the user device 201 may be referred to as a third communication mode.

According to an embodiment, the first device 202-1, the second device 202-2, and/or the user device 201 may change a communication mode to the third communication mode. For example, the user device 201 may change the communication mode based on a communication state. For example, the user device 201 may monitor the first link 205 in the first communication mode. If a communication state (e.g., signal strength and/or ACK/NACK) of the first link 205 is less than a threshold value, the user device 201 may change the communication mode. For example, if changing from the first communication mode to the third communication mode is determined, the user device 201 may transmit a signal instructing changing of the communication mode to the first device 202-1 and the second device 202-2. For another example, the user device 201 may monitor the third link 215 in the second communication mode. If a communication state (e.g., signal strength and/or ACK/NACK) of the third link 215 is less than a threshold value, the user device 201 may change the communication mode to the third communication mode. For example, if changing from the second communication mode to the third communication mode is determined, the user device 201 may transmit a signal instructing changing of the communication mode to the first device 202-1 and the second device 202-2. For another example, if a communication state (e.g., signal strength) is at least a threshold value in the third communication mode, the user device 201 may change the communication mode. For example, if changing from the third communication mode to the first communication mode is determined, the user device 201 may transmit a signal instructing changing of the communication mode to the first device 202-1 and the second device 202-2.

According to various embodiments of the disclosure, an electronic device may reduce a data delay by exchanging audio data using short-range wireless communication.

Furthermore, according to various embodiments of the disclosure, the electronic device may improve user experience of a voice call by reducing a delay in real-time voice exchange.

Furthermore, according to various embodiments of the disclosure, the electronic device may improve efficiency of a communication link by communicating with another electronic device using a link for communication with an external electronic device.

Besides, various effects may be provided that are directly or indirectly identified through the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device worn on a first user comprising:
a microphone;
an audio output circuit;
a communication circuit configured to support Bluetooth communication;
a processor connected to the microphone, the audio output circuit, and the communication circuit; and
a memory connected to the processor,
wherein the memory stores instructions that, when executed, cause the processor to:
connect to a first external electronic device by a first communication resource of a first communication link using the communication circuit,
connect to a second external electronic device, worn on a second user, by a second communication resource of a second communication link using the communication circuit,
transmit connection information comprising information associated with the first communication link to the second external electronic device via the second communication link,
receive first data from the second external electronic device on a first slot of the first communication resource for receiving data from the first external electronic device of the first communication link, the first data being obtained by a microphone of the second external electronic device,
output the first data using the audio output circuit,
obtain second data using the microphone from the first user, and
transmit the second data to the second external electronic device via the first communication link on a second slot of the first communication resource for transmitting data to the first external electronic device of the first communication link, and
wherein the information associated with the first communication link comprises control information.

2. The electronic device of claim 1, wherein the first data comprises audio data obtained by the second external electronic device.

3. The electronic device of claim 1,
wherein the instructions, when executed, further cause the processor to transmit/receive data to/from the second external electronic device at a specified period via the first communication link, and
wherein a time interval corresponding to the specified period comprises a plurality of slots.

4. The electronic device of claim 3, wherein the instructions, when executed, further cause the processor to:
receive data from the second external electronic device via the first communication link on at least one odd-numbered slot among the plurality of slots; and
transmit data to the second external electronic device via the first communication link on at least one even-numbered slot among the plurality of slots.

5. The electronic device of claim 1, wherein the connection information comprises at least one of a channel access code of the first communication link or a Bluetooth address of the first external electronic device.

6. The electronic device of claim 1, wherein the instructions, when executed, further cause the processor to:
receive, from the first external electronic device, a termination signal indicating termination of communication with the second external electronic device; and
communicate with the first external electronic device via the first communication link in response to reception of the termination signal.

7. The electronic device of claim 1, wherein the first communication link is an enhanced synchronous connection oriented (eSCO) link.

8. An electronic device worn on a first user comprising:
a microphone;
an audio output circuit;
a communication circuit configured to support Bluetooth communication;
a processor connected to the microphone, the audio output circuit; and the communication circuit; and
a memory connected to the processor,
wherein the memory stores instructions that, when executed, cause the processor to:
connect to a first external electronic device, worn on a second user, by a first communication resource of a first communication link using the communication circuit,
receive, from the first external electronic device, connection information comprising information associated with a second communication resource of a second communication link between the first external electronic device and a second external electronic device,
obtain first data using the microphone from the first user,
transmit the first data to the first external electronic device via the second communication link on a first slot of the second communication resource for transmission of the second external electronic device of the second communication link, using the connection information, the first data being obtained by the microphone of the electronic device,
receive second data from the first external electronic device via the second communication link on a second slot of the second communication resource for transmission of the first external electronic device of the second communication link, using the connection information, the second data being obtained by a microphone of the first external electronic device, and output the second data using the audio output circuit, and wherein the information associated with the second communication link comprises control information.

9. The electronic device of claim 8, wherein the instructions, when executed, further cause the processor to estimate a radio resource of the second communication link using the connection information.

10. The electronic device of claim 8, wherein the instructions, when executed, further cause the processor to transmit/receive data to/from the first external electronic device at a specified period via the second communication link, and wherein a time interval corresponding to the specified period comprises a plurality of slots.

11. The electronic device of claim 10, wherein the instructions, when executed, further cause the processor to:

transmit data to the first external electronic device via the second communication link on at least one odd-numbered slot among the plurality of slots; and receive data from the first external electronic device via the second communication link on at least one even-numbered slot among the plurality of slots.

12. The electronic device of claim 8, wherein the connection information comprises at least one of a channel access code of the second communication link or a Bluetooth address of the second external electronic device.

13. The electronic device of claim 8, wherein the second communication link is an enhanced synchronous connection oriented (eSCO) link.

14. A method for communication of an electronic device worn on a first user, the method comprising:

connecting to a first external electronic device by a first communication resource of a first communication link based on a Bluetooth protocol;

connecting to a second external electronic device, worn on a second user, by a second communication resource of a second communication link based on the Bluetooth protocol;

transmitting connection information comprising information associated with the first communication link to the second external electronic device;

receiving first data from the second external electronic device via the first communication link on a first slot of the first communication resource of the first communication link, the first data being obtained by a microphone of the second external electronic device;

outputting the first data using an audio output circuit of the electronic device;

obtaining second data from the first user using a microphone of the electronic device; and transmitting the second data to the second external electronic device via the first communication link on a second slot of the first communication resource of the first communication link, wherein the information associated with the first communication link comprises control information.

15. The method of claim 14, wherein the connection information comprises at least one of a channel access code of the first communication link or a Bluetooth address of the first external electronic device.

16. The method of claim 14, further comprising:

receiving, from the first external electronic device, a termination signal instructing termination of communication with the second external electronic device; and communicating with the first external electronic device using the first communication link in response to reception of the termination signal.

17. The method of claim 14, wherein the first communication link is an enhanced synchronous connection oriented (eSCO) link.

* * * * *